US011463457B2

(12) United States Patent
Bazalgette et al.

(10) Patent No.: US 11,463,457 B2
(45) Date of Patent: Oct. 4, 2022

(54) ARTIFICIAL INTELLIGENCE (AI) BASED CYBER THREAT ANALYST TO SUPPORT A CYBER SECURITY APPLIANCE

(71) Applicant: Darktrace Limited, Cambridge (GB)

(72) Inventors: Timothy Owen Bazalgette, Knebworth (GB); Dickon Murray Humphrey, Cambridge (GB); Carl Joseph Salji, Bedford (GB)

(73) Assignee: Darktrace Holdings Limited, Cambridge (GB)

( * ) Notice: Subject to any disclaimer, the term of this patent is extended or adjusted under 35 U.S.C. 154(b) by 18 days.

(21) Appl. No.: 16/941,870

(22) Filed: Jul. 29, 2020

(65) Prior Publication Data

US 2020/0358792 A1    Nov. 12, 2020

Related U.S. Application Data

(63) Continuation-in-part of application No. 16/278,957, filed on Feb. 19, 2019.
(Continued)

(51) Int. Cl.
*H04L 9/40* (2022.01)
*G06N 5/04* (2006.01)
*G06N 20/00* (2019.01)

(52) U.S. Cl.
CPC .......... *H04L 63/1416* (2013.01); *G06N 5/04* (2013.01); *G06N 20/00* (2019.01)

(58) Field of Classification Search
CPC ............. H04L 63/1425; H04L 63/0209; H04L 63/0428; H04L 63/101; H04L 63/14;
(Continued)

(56) References Cited

U.S. PATENT DOCUMENTS 6,154,844 A    11/2000 Touboul et al.
6,738,760 B1 *    5/2004 Krachman ............. G06Q 50/16
707/999.009
(Continued)

FOREIGN PATENT DOCUMENTS

EP    2922268 A1    9/2015
WO    2001031420 A2    5/2001
(Continued)

OTHER PUBLICATIONS

Gharan, Shayan Oveis, "Lecture 11: Clustering and the Spectral Partitioning Algorithm" May 2, 2016.
(Continued)

*Primary Examiner* — Kambiz Zand
*Assistant Examiner* — Mahabub S Ahmed
(74) *Attorney, Agent, or Firm* — Rutan and Tucker, LLP

(57) ABSTRACT

An Artificial Intelligence AI-based cyber threat analyst protects a system from cyber threats. A cyber threat analyst module uses i) one or more AI models, ii) a set of scripts, and iii) any combination of both, to form and investigate hypotheses on what are a possible set of cyber threats that include abnormal behavior and/or a suspicious activity. An analyzer module uses one or more data analysis processes including i) an agent analyzer data analysis process; ii) an Ngram data analysis process; iii) an exfiltration data analysis process; and iv) a network scan data analysis process; in order to obtain any of the abnormal behavior and the suspicious activity to start the investigation on the possible set of cyber threats hypotheses, as well as, to obtain the collection of system data points to either support or refute the possible cyber threat hypotheses.

20 Claims, 5 Drawing Sheets

Related U.S. Application Data

(60) Provisional application No. 62/880,450, filed on Jul. 30, 2019, provisional application No. 62/632,623, filed on Feb. 20, 2018.

(58) Field of Classification Search
CPC ............. H04L 63/1416; H04L 63/1433; H04L 63/1441; H04L 63/20; H04L 41/22; H04L 43/045; H04L 51/12; H04L 51/22; G06N 20/20; G06N 20/00; G06N 20/10; G06N 5/04; G06F 16/2455; G06F 40/40; G06F 3/04842; G06F 3/0486; G06F 21/36; G06F 21/554; G06F 21/556; G06K 9/6218; G06K 9/622
USPC ...................................................... 726/22–25
See application file for complete search history.

(56) References Cited

U.S. PATENT DOCUMENTS

| | | | |
|---|---|---|---|
| 6,965,968 B1 | 11/2005 | Touboul | |
| 7,307,999 B1 | 12/2007 | Donaghey | |
| 7,418,731 B2 | 8/2008 | Touboul | |
| 7,448,084 B1 | 11/2008 | Apap et al. | |
| 7,890,869 B1 | 2/2011 | Mayer et al. | |
| 8,312,540 B1 | 11/2012 | Kahn et al. | |
| 8,661,538 B2 | 2/2014 | Cohen-Ganor et al. | |
| 8,819,803 B1 | 8/2014 | Richards et al. | |
| 8,879,803 B2 | 11/2014 | Ukil et al. | |
| 8,966,036 B1 | 2/2015 | Asgekar et al. | |
| 9,043,905 B1 | 5/2015 | Allen et al. | |
| 9,106,687 B1 | 8/2015 | Sawhney et al. | |
| 9,185,095 B1 | 11/2015 | Moritz et al. | |
| 9,213,990 B2 | 12/2015 | Adjaoute | |
| 9,348,742 B1 | 5/2016 | Brezinski | |
| 9,401,925 B1 | 7/2016 | Guo et al. | |
| 9,516,039 B1 | 12/2016 | Yen et al. | |
| 9,516,053 B1 * | 12/2016 | Muddu .................. H04L 43/00 | |
| 9,641,544 B1 * | 5/2017 | Treat ....................... H04L 43/04 | |
| 9,712,548 B2 | 7/2017 | Shmueli et al. | |
| 9,727,723 B1 | 8/2017 | Kondaveeti et al. | |
| 9,736,147 B1 * | 8/2017 | Mead ....................... G06F 21/31 | |
| 9,754,106 B2 * | 9/2017 | Roundy ................. G06F 21/554 | |
| 9,965,937 B2 * | 5/2018 | Cohen .................. G06F 3/04842 | |
| 10,193,901 B2 * | 1/2019 | Muddu .............. H04L 63/1408 | |
| 10,237,298 B1 | 3/2019 | Nguyen et al. | |
| 10,268,821 B2 | 4/2019 | Stockdale et al. | |
| 10,419,466 B2 | 9/2019 | Ferguson et al. | |
| 10,516,693 B2 | 12/2019 | Stockdale et al. | |
| 10,558,809 B1 * | 2/2020 | Joyce ....................... G06N 20/10 | |
| 10,594,714 B2 * | 3/2020 | Crabtree ................. H04L 63/20 | |
| 10,701,093 B2 | 6/2020 | Dean et al. | |
| 10,931,686 B1 * | 2/2021 | Mehta .................. H04L 63/1416 | |
| 11,089,045 B2 * | 8/2021 | Crabtree ................. H04L 63/20 | |
| 2002/0174217 A1 | 11/2002 | Anderson | |
| 2002/0186698 A1 | 12/2002 | Ceniza | |
| 2003/0051026 A1 * | 3/2003 | Carter ....................... H04L 41/00 709/224 | |
| 2003/0070003 A1 | 4/2003 | Chong et al. | |
| 2003/0084349 A1 * | 5/2003 | Friedrichs ............... G06F 21/55 726/22 | |
| 2004/0083129 A1 | 4/2004 | Herz | |
| 2004/0167893 A1 | 8/2004 | Matsunaga et al. | |
| 2005/0015624 A1 * | 1/2005 | Ginter ................. H04L 63/145 726/4 | |
| 2005/0065754 A1 | 3/2005 | Schaf et al. | |
| 2007/0118909 A1 | 5/2007 | Hertzog et al. | |
| 2007/0209075 A1 * | 9/2007 | Coffman .................. H04L 63/14 709/224 | |
| 2007/0226796 A1 * | 9/2007 | Gilbert ................... G06F 21/577 726/25 | |
| 2007/0261112 A1 * | 11/2007 | Todd ................... H04L 63/1483 726/2 | |
| 2007/0294187 A1 | 12/2007 | Scherrer | |
| 2008/0005137 A1 | 1/2008 | Surendran et al. | |
| 2008/0077358 A1 | 3/2008 | Marvasti | |
| 2008/0109730 A1 | 5/2008 | Coffman et al. | |
| 2009/0106174 A1 | 4/2009 | Battisha et al. | |
| 2009/0207020 A1 * | 8/2009 | Garnier .................. G08B 21/12 340/541 | |
| 2009/0254971 A1 | 10/2009 | Herz et al. | |
| 2010/0009357 A1 | 1/2010 | Nevins et al. | |
| 2010/0095374 A1 | 4/2010 | Gillum et al. | |
| 2010/0107254 A1 | 4/2010 | Eiland et al. | |
| 2010/0125908 A1 | 5/2010 | Kudo | |
| 2010/0235908 A1 | 9/2010 | Eynon et al. | |
| 2010/0299292 A1 | 11/2010 | Collazo | |
| 2011/0093428 A1 | 4/2011 | Wisse | |
| 2011/0213742 A1 | 9/2011 | Lemmond et al. | |
| 2011/0261710 A1 | 10/2011 | Chen et al. | |
| 2012/0096549 A1 * | 4/2012 | Amini .................. H04L 63/1433 726/23 | |
| 2012/0109821 A1 * | 5/2012 | Barbour ............... G06Q 20/4016 705/44 | |
| 2012/0137367 A1 | 5/2012 | Dupont et al. | |
| 2012/0209575 A1 | 8/2012 | Barbat et al. | |
| 2012/0210388 A1 | 8/2012 | Kolishchak | |
| 2012/0284791 A1 | 11/2012 | Miller et al. | |
| 2012/0304288 A1 | 11/2012 | Wright et al. | |
| 2013/0091539 A1 | 4/2013 | Khurana et al. | |
| 2013/0097706 A1 * | 4/2013 | Titonis ................... G06F 21/566 726/22 | |
| 2013/0198119 A1 | 8/2013 | Eberhardt, III et al. | |
| 2013/0198840 A1 * | 8/2013 | Drissi ................... G06F 21/552 726/22 | |
| 2013/0254885 A1 * | 9/2013 | Devost .................... G06F 21/56 726/23 | |
| 2014/0007237 A1 | 1/2014 | Wright et al. | |
| 2014/0074762 A1 | 3/2014 | Campbell | |
| 2014/0165207 A1 * | 6/2014 | Engel .................... G06F 21/566 726/25 | |
| 2014/0201836 A1 * | 7/2014 | Amsler .................... H04L 63/20 726/23 | |
| 2014/0215618 A1 | 7/2014 | Amit | |
| 2014/0215621 A1 * | 7/2014 | Xaypanya ............. H04L 63/145 726/23 | |
| 2014/0325643 A1 | 10/2014 | Bart et al. | |
| 2015/0067835 A1 | 3/2015 | Chari et al. | |
| 2015/0081431 A1 | 3/2015 | Akahoshi et al. | |
| 2015/0161394 A1 | 6/2015 | Ferragut et al. | |
| 2015/0163121 A1 * | 6/2015 | Mahaffey ............. G06F 11/3466 707/687 | |
| 2015/0172300 A1 * | 6/2015 | Cochenour .............. G06F 21/6218 726/23 | |
| 2015/0180893 A1 | 6/2015 | Im et al. | |
| 2015/0188949 A1 * | 7/2015 | Mahaffey ............... H04W 12/37 726/1 | |
| 2015/0213358 A1 | 7/2015 | Shelton et al. | |
| 2015/0286819 A1 | 10/2015 | Coden et al. | |
| 2015/0310195 A1 * | 10/2015 | Bailor .................... G06F 21/45 726/6 | |
| 2015/0319185 A1 * | 11/2015 | Kirti .................... H04L 63/1416 726/23 | |
| 2015/0341379 A1 * | 11/2015 | Lefebvre ............... H04L 63/1425 726/22 | |
| 2015/0363699 A1 | 12/2015 | Nikovski | |
| 2015/0379110 A1 | 12/2015 | Marvasti et al. | |
| 2016/0062950 A1 | 3/2016 | Brodersen et al. | |
| 2016/0078365 A1 * | 3/2016 | Baumard ............... G06F 21/552 706/12 | |
| 2016/0149941 A1 | 5/2016 | Thakur et al. | |
| 2016/0155069 A1 * | 6/2016 | Hoover .................. G06Q 30/06 706/12 | |
| 2016/0164902 A1 * | 6/2016 | Moore ................ H04L 63/1433 726/25 | |
| 2016/0173509 A1 | 6/2016 | Ray et al. | |
| 2016/0241576 A1 | 8/2016 | Rathod et al. | |
| 2016/0352768 A1 | 12/2016 | Lefebvre et al. | |
| 2016/0359695 A1 | 12/2016 | Yadav et al. | |
| 2016/0373476 A1 | 12/2016 | Dell'Anno et al. | |
| 2017/0054745 A1 | 2/2017 | Zhang et al. | |
| 2017/0063899 A1 * | 3/2017 | Muddu .................. G06F 3/0482 | |

(56) References Cited

U.S. PATENT DOCUMENTS

| | | | |
|---|---|---|---|
| 2017/0063907 A1 | 3/2017 | Muddu et al. | |
| 2017/0063910 A1 | 3/2017 | Muddu et al. | |
| 2017/0063911 A1* | 3/2017 | Muddu | H04L 63/1433 |
| 2017/0063920 A1* | 3/2017 | Thomas | H04L 63/0272 |
| 2017/0169360 A1 | 6/2017 | Veeramachaneni et al. | |
| 2017/0171231 A1* | 6/2017 | Reybok, Jr. | H04L 63/1416 |
| 2017/0220801 A1* | 8/2017 | Stockdale | H04L 63/1433 |
| 2017/0230392 A1* | 8/2017 | Dean | H04L 63/1425 |
| 2017/0270422 A1 | 9/2017 | Sorakado | |
| 2017/0366496 A1* | 12/2017 | Habermehl | G06Q 10/101 |
| 2018/0027006 A1* | 1/2018 | Zimmermann | G06F 21/6218 |
| | | | 726/11 |
| 2018/0157838 A1* | 6/2018 | Bushey | H04L 63/1483 |
| 2018/0159877 A1* | 6/2018 | Holzhauer | H04L 63/1416 |
| 2018/0159881 A1* | 6/2018 | Crabtree | H04L 63/1425 |
| 2018/0165554 A1* | 6/2018 | Zhang | G06K 9/6256 |
| 2018/0167402 A1* | 6/2018 | Scheidler | G06N 20/00 |
| 2018/0219894 A1* | 8/2018 | Crabtree | H04L 63/20 |
| 2018/0285886 A1* | 10/2018 | Yan | G06F 16/27 |
| 2018/0316701 A1* | 11/2018 | Holzhauer | H04L 63/1433 |
| 2018/0365309 A1* | 12/2018 | Oliner | G06F 9/542 |
| 2019/0036948 A1 | 1/2019 | Appel et al. | |
| 2019/0044963 A1 | 2/2019 | Rajasekharan et al. | |
| 2019/0108334 A1* | 4/2019 | Sadaghiani | G06N 5/003 |
| 2019/0190928 A1* | 6/2019 | Anderson | H04L 9/3242 |
| 2019/0190950 A1* | 6/2019 | Senecal | H04L 63/166 |
| 2019/0251260 A1 | 8/2019 | Stockdale et al. | |
| 2020/0280575 A1 | 9/2020 | Dean et al. | |
| 2021/0120027 A1 | 4/2021 | Dean et al. | |
| 2021/0157312 A1* | 5/2021 | Celia | H04L 1/18 |
| 2021/0157919 A1 | 5/2021 | Stockdale et al. | |
| 2021/0192582 A1* | 6/2021 | Hoffberg | G07F 17/323 |
| 2021/0383232 A1* | 12/2021 | Katz | G06Q 20/065 |

FOREIGN PATENT DOCUMENTS

| | | |
|---|---|---|
| WO | 2008121945 A2 | 10/2008 |
| WO | 2013053407 A1 | 4/2013 |
| WO | 2014088912 A1 | 6/2014 |
| WO | 2015027828 A1 | 3/2015 |
| WO | 2016020660 A1 | 2/2016 |

OTHER PUBLICATIONS

Nikolystylfw, "Can Senseon beat Darktrace at its very own game with its 'An I triangulation' modern technology?" Dec. 22, 2018, nikolystylfw.

Lunden, Ingrid, "Senseon raises $6.4M to tackle cybersecurity threats with an AI 'triangulation' approach" Feb. 19, 2019, Tech Crunch.

Senseon Tech LTD., "The State of Cyber Security SME Report 2019," Jun. 3, 2019.

Senseon Tech LTD., "Technology," * please see the statement filed herewith.

Senseon Tech LTD., "Senseon & You," * please see the statement filed herewith.

Senseon Tech LTD., "Technology Overview," * please see the statement filed herewith.

Senseon Tech LTD., "Senseon Enterprise," * please see the statement filed herewith.

Senseon Tech LTD., "Senseon Pro," * please see the statement filed herewith.

Senseon Tech LTD., "Senseon Reflex," * please see the statement filed herewith.

Abdallah Abbey Sebyala et al., "Active Platform Security through Intrusion Detection Using Naive Bayesian Network for Anomaly Detection," Department of Electronic and Electrical Engineering, 5 pages, University College London, Torrington Place, England, United Kingdom.

Marek Zachara et al., "Detecting Unusual User Behavior to identify Hijacked Internet Auctions Accounts," Lecture Notes in Computer Science, 2012, vol. 7465, Springer, Berlin, Heidelberg, Germany.

* cited by examiner

ARTIFICIAL INTELLIGENCE (AI) BASED CYBER THREAT ANALYST TO SUPPORT A CYBER SECURITY APPLIANCE

RELATED APPLICATION

This application claims priority to and the benefit of under 35 USC 119 of U.S. provisional patent application titled "A CYBER SECURITY SYSTEM WITH ENHANCEMENTS," filed Jul. 30, 2019, Ser. No. 62/880,450, which is incorporated herein by reference in its entirety. In addition, this application claims priority to and the benefit as a continuation in part application of under 35 USC 120 of U.S. patent application titled "ARTIFICIAL INTELLIGENCE RESEARCHER ASSISTANT FOR CYBER SECURITY ANALYSIS" filed Feb. 19, 2019, Ser. No. 16/278,957, which claims the benefit of under 35 USC 119 to U.S. provisional patent application titled "A cyber defense system with various improvements," filed Feb. 20, 2018, Ser. No. 62/632,623, which is incorporated herein by reference in its entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Embodiments of the design provided herein generally relate to a cyber threat defense system. In an embodiment, Artificial Intelligence (AI) is applied to analyzing cyber security threats, where the AI does both the analysis and data gathering to assess cyber threats to the system.

BACKGROUND

With the real time speed of attacks and almost overwhelming volume of data within a system, a task of examining suspicious activities and/or abnormal behavior in a system is very difficult for a human analyst to keep up with or perform; and thus, early detection of cyber threats may not occur until after the cyber threat has already caused significant harm.

SUMMARY

In an embodiment, an AI based cyber security analyst protects a system, including but not limited to a network, from cyber threats. The AI-based cyber threat can have at least the following components.

An analyzer module has one or more data analysis processes to cooperate with one or more AI classifiers in an assessment module by producing features for the AI classifiers.

The analyzer module with one or more data analysis processes cooperates with one or more AI models trained with machine learning on the normal pattern of life in the system, to identify at least one of i) the abnormal behavior, ii) the suspicious activity, and iii) the combination of both, from one or more entities in the system.

A cyber threat analyst module is configured to form and investigate hypotheses on what are a possible set of cyber threats. The cyber threat analyst module to form and investigate hypotheses on what are a possible set of cyber threats cooperates with the analyzer module with the one or more data analysis processes to conduct an investigation on a possible set of cyber threats hypotheses that would include the at least one of i) the abnormal behavior, ii) the suspicious activity, and iii) any combination of both, identified through cooperation with the one or more AI models trained with machine learning on the normal pattern of life in the system.

A cyber threat analyst module can use i) one or more AI models to form and investigate hypotheses, ii) a set of scripts to form and investigate hypotheses, and iii) any combination of both, in order to form and investigate hypotheses on what are a possible set of cyber threats. The cyber threat analyst module to form and investigate hypotheses on what are a possible set of cyber threats can use any of i) the one or more AI models to form and investigate hypotheses trained with supervised machine learning on human-led cyber threat investigations and then steps, data, metrics, and meta data on how to support or to refute the hypotheses on what are a possible set of cyber threats, ii) the set of scripts to form and investigate hypotheses to aid in how to form the hypotheses on what are a possible set of cyber threats and then the steps, data, metrics, and meta data to collect additional system data points to support or to refute the possible cyber threat hypotheses, and iii) any combination of both.

The analyzer module uses one or more data analysis processes cooperating with a range of data analysis processes that produce features for the AI classifiers in the assessment module including i) an agent analyzer data analysis process coded to detect the cyber threat, such as a malicious agent, previously unknown to the system, using either an 1) analysis of JA3 hashes when monitoring and analyzing a secured communication connection without needing to decrypt content in network traffic or 2) an analysis of user agent data when monitoring and analyzing an unsecured communication connection; ii) an Ngram data analysis process coded to assess an address string under analysis to determine the address string's 1) similarity to or 2) anomaly from known good and bad populations of address strings; iii) an exfiltration data analysis process coded to identify and correlate 1) data transfers to one or more online services as well as 2) data transfers to one or more other external network locations when multiple different Internet Protocol (IP) addresses exist for that online service or that other external network location; and iv) a network scan data analysis process coded to create a virtual tree of IP address space to detect when abnormal scans of one or more IP address ranges occurs; in order to obtain any of the abnormal behavior and the suspicious activity to start the investigation on the possible set of cyber threats hypotheses, as well as, to obtain the collection of system data points to either support or refute the possible cyber threat hypotheses.

An assessment module with AI classifiers cooperates with one or more AI models trained on possible cyber threats in order assign a numerical assessment of a given cyber threat hypothesis that was found likely to be supported by the analyzer module with the one or more AI classifiers, via the abnormal behavior, the suspicious activity, or the collection of system data points.

A formatting module formats, presents, and outputs one or more supported possible cyber threat hypotheses as well as one or more refuted possible cyber threat hypotheses from any of the analyzer module and the assessment module into a formalized report, from a first template of a plurality of report templates, that is outputted for a human user's consumption in a medium of any of 1) printable report, 2) presented digitally on a user interface, 3) in a machine readable format for further use in machine-learning reinforcement and refinement, or 4) any combination of the three.

These and other features of the design provided herein can be better understood with reference to the drawings, description, and claims, all of which form the disclosure of this patent application.

DRAWINGS

The drawings refer to some embodiments of the design provided herein in which.

Figure 1A:
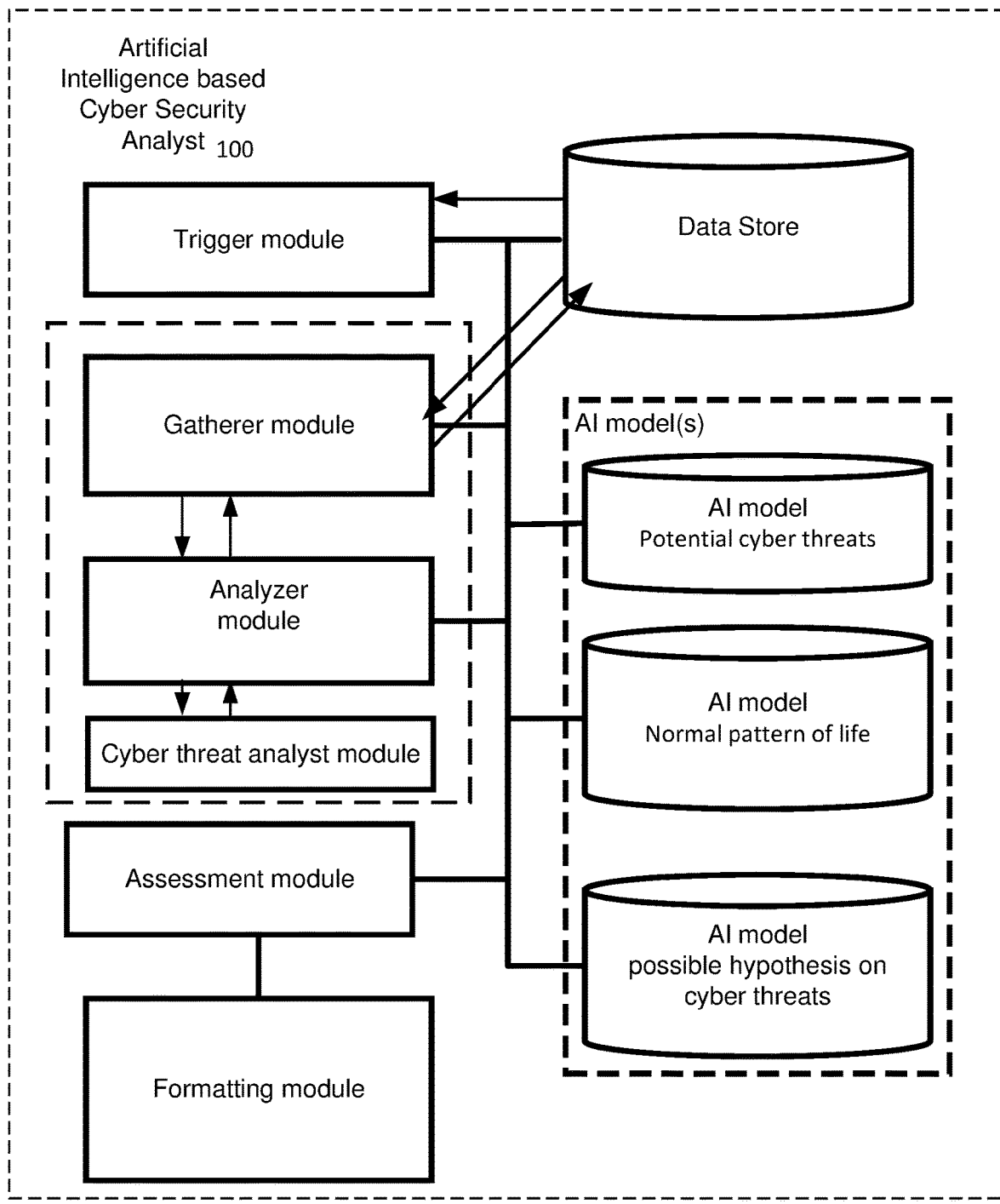
FIGS. 1A and 1B illustrate block diagrams of an embodiment of the AI based cyber threat analyst to protect a system, including but not limited to a network, from cyber threats.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

In general, the AI-based cyber threat analyst sees something abnormal or suspicious, then the AI-based cyber threat analyst forms one or more hypotheses on what are the possibilities to cause this abnormal behavior or suspicious activity, then the AI based cyber threat analyst finds evidence/collects additional data to support or refute each possible hypothesis, and then generates a formal report.

Figure 1B:
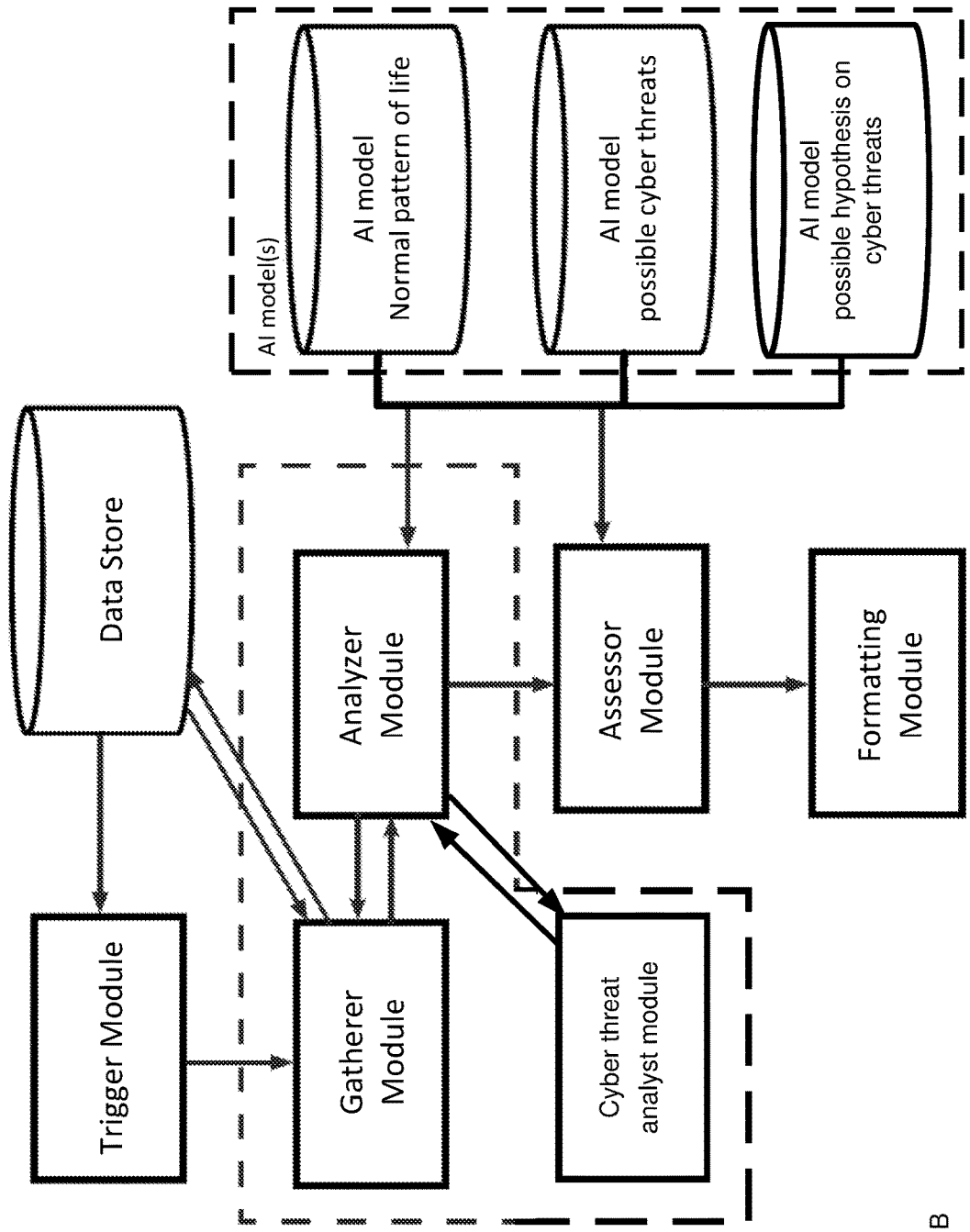

FIGS. 1A and 1B illustrate block diagrams of an embodiment of the AI based cyber threat analyst to protect a system, including but not limited to a network, from cyber threats.

The AI-based cyber threat analyst 100 may include a trigger module, a gatherer module, an analyzer module, an assessment module, a formatting module, one or more AI models trained with machine learning on a normal pattern of life in the system, a cyber threat analyst module to form and investigate hypotheses on what are a possible set of cyber threats, and one or more AI models trained on possible cyber threats.

The trigger module may identify, with one or more AI models trained with machine learning on a normal pattern of life in the system, at least one of i) an abnormal behavior, ii) a suspicious activity, and iii) any combination of both, from one or more entities in the system.

The analyzer module has one or more data analysis processes to cooperate with one or more AI classifiers in an assessment module by producing features for the AI classifiers. The data analysis processes can be algorithms/scripts written by humans to perform their function discussed herein; and, can in various cases use AI classifiers as part of their operation. Note, any portions of the AI based cyber threat analyst implemented as software can be stored in one or more non-transitory memory storage devices in an executable format to be executed by one or more processors.

A cyber threat analyst module can use i) one or more AI models to form and investigate hypotheses, ii) a set of scripts to form and investigate hypotheses, and iii) any combination of both, in order to form and investigate hypotheses on what are a possible set of cyber threats. The cyber threat analyst module to form and investigate hypotheses on what are a possible set of cyber threats can use any of i) one or more AI models to form and investigate hypotheses trained with supervised machine learning on human-led cyber threat investigations and then steps, data, metrics, and meta data on how to support or to refute the hypotheses on what are a possible set of cyber threats, ii) the set of scripts to form and investigate hypotheses to aid in how to form the hypotheses on what are a possible set of cyber threats and then the steps, data, metrics, and meta data to collect additional system data points to support or to refute the possible cyber threat hypotheses, and iii) any combination of both.

The cyber threat analyst module configured to form and investigate hypotheses on what are a possible set of cyber threats cooperates with the analyzer module with the one or more data analysis processes to conduct an investigation on a possible set of cyber threats hypotheses that would include at least one of i) the abnormal behavior, ii) the suspicious activity, and iii) any combination of both, identified through cooperation with the one or more AI models trained with machine learning on the normal pattern of life in the system.

The gatherer module may collect data to support or refute each of the one or more possible cyber threat hypotheses that could include this abnormal behavior or suspicious activity by cooperating with the cyber threat analyst module to form and investigate hypotheses on what are a possible set of cyber threats and the analyzer module.

The gatherer module may further extract data at the request of the analyzer module on each possible hypothetical threat that would include the abnormal behavior or suspicious activity and then filtering that collection of data down to relevant points of data to either 1) support or 2) refute each particular hypothesis of what the cyber threat, the suspicious activity and/or abnormal behavior relates to. The gatherer module may send the filtered down relevant points of data to either 1) support or 2) refute each particular hypothesis to the analyzer module, comprised of one or more algorithms used by the AI models trained with machine learning on possible cyber threats to make a determination on a probable likelihood of whether that particular hypothesis is supported or refuted.

The analyzer module may use one or more data analysis processes including i) an agent analyzer data analysis process coded to detect a potentially malicious agent previously unknown to the system using either an 1) analysis of JA3 hashes when monitoring and analyzing a secured communication connection without needing to decrypt content in network traffic or 2) an analysis of user agent data when monitoring and analyzing an unsecured communication connection; ii) an Ngram data analysis process coded to assess an address string under analysis to determine the address string's 1) similarity to or 2) anomaly from known good and bad populations of address strings; iii) an exfiltration data analysis process coded to identify and correlate 1) data transfers to one or more online services as well as 2) data transfers to one or more other external network locations when multiple different Internet Protocol (IP) addresses exist for that online service or that other external network location; and iv) a network scan data analysis process coded to create a virtual tree of IP address space to detect when abnormal scans of one or more IP address ranges occurs. As well as, the analyzer module can use one or more of the above four data analysis processes to determine or otherwise obtain a collection of additional system data points to either support or refute the one or more possible cyber threat hypotheses.

The AI classifiers can be part of the assessment component, which scores the outputs of the analyzer module. The AI classifier can be coded to take in multiple pieces of information about an entity, object, or thing and based on its training then output a prediction about the entity, object, or thing. Given one or more inputs the AI classifier model will try to predict the value of one or more outcomes. The AI classifiers cooperate with the range of data analysis processes that produce features for the AI classifiers. The various techniques cooperating here allow anomaly detection and assessment of a cyber threat level posed by a given anomaly; but more importantly, an overall cyber threat level posed by a series of correlated anomalies under analysis.

i) Malicious Agent Detection Using Either 1) an Analysis of JA3 Hashes when Monitoring and Analyzing a Secured Connection and an Analysis of User Agent Data when Monitoring and Analyzing an Unsecured Connection Factoring in at Least how Rare is it for i) a Process, ii) a Device, or iii) Both to Connect to that Connection from this Network In an embodiment, the analyzer module may use the agent analyzer data analysis process to detect a potentially malicious agent previously unknown to the system using either 1) the analysis of JA3 hashes when monitoring and analyzing a secured connection, such as HTTPS, SSH, etc., without needing to decrypt content in network traffic or 2) an analysis of user agent data when monitoring and analyzing an unsecured connection, such as HTTP, factoring in at least how rare is it for i) a process, ii) a device, or iii) both to connect to that connection from this network. (For example, see FIG. 3 for an example network being protected by the AI based cyber threat analyst).

The analyzer module may use the agent analyzer data analysis process to at least one of i) identify the abnormal behavior, ii) identify the suspicious activity, iii) provide the additional system data points, and iv) any combination of these three, from the one or more entities in the system in order to at least one of 1) start and 2) further the investigation on the possible cyber threat hypotheses.

In step 1, an initial training of Artificial Intelligence models occurs using unsupervised learning and/or supervised learning on characteristics and attributes of known potential cyber threats including malware, insider threats, and other kinds of cyber threats. The AI model learns at least both in the pre-deployment training i) exact characteristics and attributes of known potential cyber threats as well as ii) a set of characteristics and attributes of each category of potential cyber threats and their weights assigned on how indicative certain characteristics and attributes correlate to potential cyber threats of that category of threats. Later, when in deployment in an operational network being protected by the cyber security appliance, the AI model can potentially determine whether a potential unknown threat has been detected via number of techniques including an overlap of some of the same characteristics and attributes in that category of threats. The AI models trained with machine learning on possible cyber threats use at least one or more supervised machine learning models during pre-deployment training.

Likewise, pre-deployment machine learning training of one or more Artificial Intelligence models trained on a normal behavior of the system can occur. Initial training of one or more Artificial Intelligence models trained with machine learning on a normal behavior of the pattern of life of the system occurs where each type of network and/or system will generally have some common typical behavior with each model trained specific to components/devices, protocols, activity level, etc. to that type of system. Likewise, one or more supervised machine learning AI models are trained to create possible hypothesis and perform cyber threat investigations on agnostic examples of past historical incidents of detecting of a multitude of possible types of cyber threat hypotheses previously analyzed by human cyber threat analysis.

As discussed in more detail below, the analyzer module can cooperate with the one or more unsupervised machine learning models trained on the normal pattern of life in order to perform anomaly detection versus the actual normal pattern of life for that system to determine whether the identified abnormal behavior and/or suspicious activity is malicious or benign. In operation of the cyber security appliance, when the potential cyber threat is previously unknown, and correctly identified as malicious or benign, then the AI models trained with machine learning on possible cyber threats updates it training. In addition, as the system continues to operate, then the one or more machine learning models trained on a normal pattern of life are updated and trained to this system with unsupervised machine learning algorithms. The analyzer module can use any number of data analysis processes (discussed more in detail below and including the agent analyzer data analysis process here) to help obtain system data points so that this data can be fed and compared to the one or more machine learning models trained on a normal pattern of life, as well as the one or more machine learning models trained on potential cyber threats, as well as create and store data points of with the connection finger prints.

All of the above AI models can continually learn and train with unsupervised machine learning algorithms on an ongoing basis when deployed in their system that the cyber security appliance is protecting.

Next, as discussed further below, during pre-deployment the analyzer module uses data analysis processes and cooperates with AI models trained on forming and investigating hypotheses on what are a possible set of cyber threats. Again, another set of AI models are trained on forming and investigating hypotheses on what are a possible set of cyber threats and steps to take in supporting or refuting hypotheses. The AI models trained on forming and investigating hypotheses are updated when correctly supporting or refuting the hypotheses including what additional collected data proved to be the most useful.

Similarly, during deployment, the data analysis processes (discussed herein) used by the analyzer module can use unsupervised machine learning to update the initial training learned during pre-deployment, and then update the training with unsupervised learning algorithms during the cyber security appliance's deployment in the system being protected when various different steps to either i) support or ii) refute the possible set of cyber threats hypotheses worked better or worked worse.

In step 2, the cyber security appliance with the Artificial Intelligence (AI) based cyber threat analyst may protect a system, from a cyber threat. In an embodiment, the cyber security appliance can protect all of the devices on the network by monitoring network traffic going to and from these devices on the network.

In step 3, a data gather module may have a process identifier module. The process identifier module can identify and track each process and device in the network making communication connections. A data store cooperates with the process identifier module to collect and maintain historical data of processes and their connections, which is updated over time as the network is in operation. In an example, the process identifier module can identify each process running on a given device along with its endpoint connections, which is stored in the data store.

In step 4, the process identifier module cooperating with the agent analyzer data analysis process can also be configured to apply a JA3 hash function to network traffic transiting over a secure communication connection, like HTTPS, between network components and/or perform an analysis of user agent data to network traffic transiting over an unsecure communication connection, like HTTP, in order to generate the 'process connection fingerprints.' The agent analyzer data analysis process can be configured to compute JA3 hashes and analyze user agent data, every time a communication connection happens in order to calculate the 'process connection fingerprints' derived from the user agent data and/or JA3 data. The process identifier module cooperating with the agent analyzer data analysis process may apply the JA3 hash function to network traffic transiting over the secure communication connection and/or perform an analysis of user agent data to network traffic transiting over the unsecure communication connection in order to generate the process connection fingerprints, which can also be stored in the data store. The process connection fingerprints contain multiple characteristics of the endpoint connection.

The agent analyzer data analysis process in the analyzer module may cooperate with the process identifier module to identify all of the additional factors of i) are one or more processes running independent of other processes, ii) are the one or more processes running independent are recent to this network, and iii) are the one or more processes running independent connect to the endpoint, which the endpoint is a rare connection for this network, which are referenced and compared to one or more AI models trained with machine learning on the normal behavior of the pattern of life of the system.

Note, a user agent, such as a browser, can act as a client in a network protocol used in communications within a client-server distributed computing system. In particular, the Hypertext Transfer Protocol (HTTP) identifies the client software originating the request, using a user-agent header, even when the client is not operated by a user. Note, this identification can be faked, so it is only a weak indicator of the software on its own, but when compared to other observed user agents on the device, this can be used to identify possible software processes responsible for requests.

Note, the process identifier module may use a number of different JA3 hash algorithms for fingerprinting secure connections such as Transport Layer Security (TLS) applications.

The 'process connection fingerprint' created from the JA3 can overlap between different applications running processes but are still a great Indicator of Comprise (IoC). Note, JA3s can be very weak indicators of compromise on their own, but when compared to and combined with other observed data points, this can be powerful when used to identify possible software processes on a given device.

Let's take the following JA3 hash for example: 3e860202fc555b939e83e7a7ab518c38. According to one of the public lists that maps JA3s to applications, this JA3 hash is associated with the tola_svc' application. This Hola VPN solution is identified as non-compliant in most enterprise networks. On the other hand, the following hash is associated with the popular messenger software Slack: a5aa6e939e4770e3b8ac38ce414fd0d5. Traditional cyber security tools can use these hashes like traditional signatures to search for instances of them in data sets or trying to blacklist malicious ones. The TLS/SSL protocol enables encrypted communications, whether that be HTTPS, SSH, or any other. The obvious benefit of this encryption is that it prevents others from being able to see the content within the network traffic to decipher what you are doing. As discussed, the agent analyzer data analysis process may, for example, create JA3 hashes for every TLS/SSL connection it encounters and then add in additional endpoint connect details to create the process connection fingerprints. This is incredibly powerful in a number of ways. First, the JA3 can add invaluable context to a threat hunt. Second, the data store can also be queried to see if a particular JA3 was encountered in the network; thus, providing actionable intelligence during incident response when JA3 Indicators of Compromise (loCs) are known to the artificial intelligent based analyst assisting incident responders. Moreover, the processes identified based on their JA3 can then be assessed for maliciousness. Note, this isn't done by checking the JA3 against a known blacklist, but by passing various properties of the activity of that process to a classifier. Note, hackers try to evade simple JA3 signature detection by changing that signature so often a new piece of malware will have a different JA3 signature than previously cataloged. The current method can be used in addition to a method that blacklists known malware signatures. The new process connection fingerprints contain multiple characteristics of the endpoint connection, which can be cross referenced as part of the connection fingerprint when one or more aspects change from a previous JA3 fingerprint.

In an example, user agent identification can be as follows. When a software agent operates in a network protocol, it often identifies itself, its application type, operating system, software vendor, or software revision, by, submitting a characteristic identification string to its operating peer. In HTTP, SIP, and NNTP protocols, this identification is transmitted in a header field Example, user-agent bots, such as Web crawlers, often also include a URL and/or e-mail address so that the Webmaster can contact the operator of the bot.

In step 5, the trigger module can cooperate with one or more AI models trained with machine learning on a normal pattern of life in the system, to use at least one of i) an abnormal behavior, ii) a suspicious activity, and iii) any combination of both, from one or more entities in the system in order to assist an investigation on a possible set of cyber threats that would include the at least one of i) an abnormal behavior, ii) a suspicious activity, and iii) any combination of both.

The analyzer module can be configured with one or more data analysis processes to cooperate with the one or more AI models trained with machine learning on the normal pattern of life in the system, to identify at least one of i) the abnormal behavior, ii) the suspicious activity, and iii) the combination of both, from one or more entities in the system. Note, other sources, such as other model breaches, can also identify at least one of i) the abnormal behavior, ii) the suspicious activity, and iii) the combination of both to trigger the investigation.

The analyzer module may use the agent analyzer data analysis process that detects a potentially malicious agent previously unknown to the system via using either an 1) analysis of JA3 hashes when monitoring and analyzing a secured communication connection without needing to decrypt content in network traffic or 2) an analysis of user agent data when monitoring and analyzing an unsecured communication connection to start an investigation on one or more possible cyber threat hypotheses. The determination and output of this step is what are possible cyber threats that can include or be indicated by the identified abnormal behavior and/or identified suspicious activity identified by the agent analyzer data analysis process.

The analyzer module may use the agent analyzer data analysis process to detect a potentially malicious agent previously unknown to the system using either an 1) analysis of JA3 hashes when monitoring and analyzing a secured connection without needing to decrypt content in network traffic or 2) an analysis of user agent data when monitoring and analyzing an unsecured connection to collect additional system data points to support or refute the one or more possible cyber threat hypotheses, which factors in at least how rare is it for 1) a process, 2) a device, or 3) both to connect to the endpoint connection from this network.

The analyzer module can use the agent analyzer data analysis process to create and/or analyze additional data points, including data, metrics, and meta data, obtained from the malicious agent detection using either an analysis of i) JA3 hashes when monitoring and analyzing a secured encrypted connection, like a SSL connection, and an analysis of user agent data when monitoring and analyzing an unsecured connection, to identify abnormal behavior and/or suspicious activity data with the one or more AI models trained with machine learning on possible cyber threats. An initial analysis of the i) JA3 hashes when monitoring and analyzing details of an endpoint of the secured connection and what process and/or device is making that secured connection with the endpoint of the secured connection; and/or analysis of user agent data when monitoring and ii) analyzing an unsecured connection can identify the initial abnormal behavior and/or suspicious activity data.

Cyber threat analyst module configured to form and investigate hypotheses on what are a possible set of cyber threats are configured to cooperate with the analyzer module with the one or more data analysis processes to conduct an investigation on a possible set of cyber threats hypotheses that would include the at least one of i) the abnormal behavior, ii) the suspicious activity, and iii) any combination of both, identified through cooperation with the one or more AI models trained with machine learning on the normal pattern of life in the system.

Many other model breaches of the AI models trained with machine learning on the normal behavior of the system can trigger an investigation to form one or more hypotheses on what are a possible set of cyber threats that could include the initially identified abnormal identified abnormal behavior and/or suspicious activity. Note, a deeper analysis of the i) JA3 hashes when monitoring and analyzing a secured connection and/or analysis of user agent data when monitoring and analyzing an unsecured connection can also be used as additional data to help support or refute possible cyber threat hypotheses. For example, the deeper analysis can look at example factors such as i) how long has the endpoint existed or is registered; ii) what kind of certificate is the communication using; iii) is the endpoint on a known good domain or known bad domain or an unknown domain, and if unknown what other information exists such as registrant's name and/or country; iv) how rare; v) etc.

An analyzer module can analyze all endpoint connections split up by JA3 hashes or user agent data, such as user agent strings by similarity to each other. The analyzer module groups similar JA3 connections (or user agent data) and separates them out or user agent data and separates them out in multiple groups in order to analyze the smaller groups of similar i) JA3 connections individually linked to each distinct process range of distinct connection endpoints or ii) user agent data individually linked to each distinct process' user agent data for the range of distinct connection endpoints.

This subdivision of, for example, JA3 connections can cut down on the number of false positive assertions of a potential malicious agent.

The determination and output of this step is 'are the results of this investigation interesting enough to report out and/or pass onto either a human-led cyber investigation and/or final in-depth artificial intelligence based cyber threat investigation' that can trigger an autonomous response action.

The AI based cyber analyst provides an advantage as it reduces the time taken for human led or cybersecurity investigations, provides an alternative to manpower for small organizations and improves detection (and remediation) capabilities within the cyber security platform.

In step 6, the analyzer module may cooperate with the trigger module for the investigation to form one or more hypotheses on what are a possible set of cyber threats that could include the initially identified abnormal behavior and/or suspicious activity with one or more AI models trained with machine learning on possible cyber threats.

Cyber threat analyst module configured to form and investigate hypotheses on what are a possible set of cyber threats that would include the at least one of i) an abnormal behavior, ii) a suspicious activity, and iii) any combination of both, identified through the one or more Artificial Intelligence models trained with machine learning on a normal pattern of life in the system.

The analyzer module using the agent analyzer data analysis process may cooperate with the cyber threat analyst module configured to form and investigate hypotheses on what are the possible set of cyber threats in order to start the investigation to form one or more hypotheses on what are the possible set of cyber threats that could include the initially identified abnormal behavior and/or suspicious activity, as well as, 2) where the analyzer module using the agent analyzer data analysis process is configured to cooperate with the data store to gather system data points to support or refute the investigation on possible cyber threats.

Next, the process identifier module is then configured to cooperate with the data gathering module to collect any additional data and metrics either to support or to refute possible cyber threat hypothesis. The analyzer module can also look for other anomalies, such as model breaches, and other techniques discussed above, while the AI models trained on potential cyber threats in order to assist in examining and factoring these additional data points that have occurred over a given timeframe to see if a correlation exists between a series of two or more anomalies occurring within that time frame.

The initially identified abnormal behavior and/or suspicious activity may be, for example, a system misconfiguration, true human error, or an actual cyber threat including artificial intelligent based cyber threats that specifically try to distribute its malicious behavior over a number of events over a number of days so that no single event appears to be an overt cyber-attack. Finally, the analyzer module may conduct the investigation and make a final decision that need not be a positive determination that a cyber threat has been detected but rather a determination that something interesting is occurring in the system. The something interesting could be a possible cyber threat but at least one of i) should be brought to an attention of a human cyber security analysis and ii) further warrants a more in-depth human-led and/or an in-depth machine-learning-led automated cyber threat investigation with the one or more AI models trained on potential cyber threats. The one or more AI models trained on potential cyber threats and the assessment module with the AI classifiers can determine that a cyber-attack is occurring and assign a numerical assessment of the most likely cyber threat hypothesis that is occurring, which is indicative of a severity of the cyber-attack underway. The assessment module with the AI classifiers can cooperate with an autonomous response module to determine an appropriate response to mitigate the cyber-attack that is occurring.

The cyber threat analyst module configured to form and investigate hypotheses on what are the possible set of cyber threats are configured to use any of i) supervised machine learning on human-led cyber threat investigations and then steps, data, metrics, and meta data on how to support or to refute a plurality of the possible cyber threat hypotheses, and ii) a combination of both a set of scripts to aid in forming one or more hypotheses on what are the possible set of cyber threats as well as the supervised machine learning on human-led cyber threat investigations and then the steps, data, metrics, and meta data on how to support or to refute the plurality of the possible cyber threat hypotheses.

Again, the analyzer module analyzes the collection of system data points, including the data, metrics, and meta data, to either 1) support or 2) refute each of the plurality of possible cyber threat hypotheses that could include the identified abnormal behavior and/or suspicious activity data with the one or more AI models trained with machine learning on possible cyber threats.

In this example, the analyzer module can use the agent analyzer data analysis process and the AI models trained on forming and investigating hypotheses on what are a possible set of cyber threats to use the machine learning and/or set scripts to aid in forming one or more hypotheses to support or refute each hypothesis. The analyzer module can cooperate with the AI models trained on forming and investigating hypotheses to form an initial set of possible hypothesis, which needs to be intelligently filtered down.

The analyzer module can be configured to use the one or more supervised machine learning models trained on
1) agnostic examples of past history of detection of a multitude of possible types of cyber threat hypotheses previously analyzed by human, who was a cyber security professional,
2) the steps taken by the human cyber security professional to narrow down and identify a potential cyber threat, and
3) what type of data and metrics that were helpful to further support or refute each of the types of cyber threats, in order to determine a likelihood of whether the abnormal behavior and/or suspicious activity is either i) malicious or ii) benign?

The analyzer module cooperates with the AI models trained on cyber threats can even determine whether the abnormal behavior and/or suspicious activity is either 1) malicious or 2) benign when the potential cyber threat under analysis is previously unknown to the cyber security appliance.

The analysis module cooperates with the AI models of cyber threats module and the AI models trained on forming and investigating hypotheses that uses a plurality of scripts guided by the AI learning to walk through a step by step process of what data points to collect in order to filter down to the relevant data points (from the potentially millions of data points occurring in the network) to assist the analyzer module in making a decision on possible cyber threats. The analyzer module can be guided by the AI model with the machine learning on the process of a human cyber security professional analyzing possible cyber threats and the relevant data points human analysts examine to either support or rebut their analysis of each given cyber threat hypothesis. The data gathering module and the analyzer module cooperate to supply further data and/or metrics requested by the analyzer module when guided by the machine learning on the process of the human cyber security professional analyzing possible cyber threats and the relevant data points human analysts examine to support or rebut their analysis of a given cyber threat hypothesis.

As a starting point, the AI-based cyber threat analyst can use the analyzer module to identify abnormal behavior and/or suspicious activity. The analyzer module can use i) the analysis of the JA3 hashes of the secured connection and/or ii) analysis of the user agent data of unsecured connections that are rare for that network in order to identify abnormal behavior and/or suspicious activity; and thus, determine whether a likelihood exists that malicious activity with a given agent on the secured connection or unsecured connection, as appropriate, is likely occurring. Again, the user agent request header can be a characteristic string that lets servers and network peers identify the application, operating system, vendor, and/or version of the requesting user agent. The analyzer module determines whether malicious activity i) is likely occurring via JA3 on the secured connection and/or ii) is likely occurring with a given user agent because of the rarity of connecting to that user agent, country of registration, peculiarity of the user agent data, and/or other possible indicators associated with potential malicious nature. Again, the process connection fingerprints can contain these multiple characteristics of an endpoint connection.

The malicious activity may be a domain fronting threat, for example, a device beaconing to an anomalous content delivery network (CDN) of servers with an unusual JA3 hash that is rarely connected to this network. When a process on that device (especially a new process) is the only process communicating with this domain not known to be a legitimate domain, then this process is identified as an abnormal process that warrants further investigation.

The data store tracks the processes and devices that are making connections and can store pairings of agent and processes as well as any of their associated features in the data store in order to pull out relevant features. In another algorithm, the analyzer module may merely look at each endpoint connection for, for example, an SSL connection and its associated hashes to identify abnormal behavior and/or suspicious activity because of the rarity of connecting to that endpoint connection, country of registration, peculiarity of the domain associated with the endpoint connection, and/or other possible indicators. The analyzer module cooperates with the process identifier module and AI model of normal pattern of life to build up an understanding of what are normal processes and connections; and thus, what would be then abnormal processes and connections for this particular network. Note, malicious software running as a distinct process that connects to a range of very rare distinct endpoints for this network can be a heavy indicator to classify that process as an abnormal process. The AI analyst builds up an analysis of the JA3 hashes and user agents of secure and unsecure connections, such as SSL and HTTP connections, which respectively can allow for the identification of these unique abnormal processes from the noise of connections made by legitimate processes, such as browsers, which are classified as normal process for this particular network.

The analyzer module analyzes the connections and pulls out the processes that the analyzer module determines are potentially malicious agents that are interesting via the JA3 analysis and/or user agent data analysis. The analyzer module also pulls out the data known to be useful to differentiate between a normal process making connections and an abnormal process (potentially a malicious software agent) making connections from those connections. In an example, the analyzer module can use both analysis of i) the JA3 hashes of specifically SSL connections and/or ii) the user agent request header of HTTP connections to determine whether malicious activity is likely occurring with a given process.

As discussed, an analyzer module can perform a machine learning analysis of the JA3 hashes of SSL connections and user agents of HTTP connections to understand what a normal process is; and thus, by deviation, what is an abnormal process. This analysis can allow for the identification of these unique abnormal processes via the rarity of connecting to that connection from this network, country of registration associated with that connection, peculiarity of the connection data, JA3 fingerprint analysis, and/or other possible indicators associated with potential malicious nature in comparison to the general noise of connections made by legitimate processes such as browsers. The analysis can incorporate modelling the endpoints and connection pattern of life on a device to identify normal processes and abnormal processes when combined with multiple factors, which can subsequently be determined to be an actual malicious agent. For example, a given malicious agent may be 1) making an unusual connection for that process in the device that is rare from this network based on the connection pattern of life of that device and its processes, and factoring 2) i) no other process is making that connection (in the case of a local malicious agent) or ii) merely a few other processes are making that connection (in the case of a distributed malicious agent) for that system, country of registration associated with that connection, peculiarity of the connection data, JA3 fingerprint analysis/user agent data analysis, and/or other possible indicators associated with potential malicious nature. Note, a distributed malware may infect two or more devices to carry out its malicious actions; and thus, even if a couple of devices in the network start establishing connections with a potentially malicious domain within a short timeframe and then no other device has ever communicated with that potentially malicious domain, then that also can be a strong indicator of potential maliciousness.

An analyzer module weights in knowledge that malicious software typically runs as a distinct process, and may connect to a range of distinct endpoints. The analyzer module analysis of the created 'process connection fingerprints' derived from JA3 hashes of secure connections and user agent data of unsecure connections allows for the identification of these unique abnormal processes from legitimate processes such as browsers. The analyzer module may also use this similar machine learning training to identify other cyber threats, such as insider threats.

Note, the analyzer module can create a matrix working out what are the properties of an identified process and grab relevant data for the identified process that are going to be interesting via the agent analyzer data analysis process.

The unsupervised machine learning can be applied to the JA3 data and user agent data. For example, the agent analyzer data analysis process uses algorithms to autonomously detect which JA3s are anomalous for the network as a whole as well as which JA3s are unusual for specific processes in specific devices. An AI model modelling this specific network's behavior can be developed overtime from the base training to observe JA3s that have been encountered before as well as their frequency of occurrence and this can be tailored for each device in the network. The analysis module cooperating with the AI models essentially determine, in an example: this JA3 (3e860202fc555b939e83e7a7ab518c38) has never (or very rarely) been seen in the network before and it is merely used by one device (two to three if a distributed malicious agent). The modules cooperating with each other and the AI models indicate that a process, such as an application or service, is connecting to endpoint destinations, which are used by essentially nobody else on the network, and this process is initiating secure connections, such as TLS/SSL connections, to these destinations. At this point, the analysis module is observing anomalous behavior. This trigger creates a scenario under analysis that is likely often the case for an agent, such as malware or non-compliant software.

Again, the process identifier module cooperates with the trigger module to collect additional data on one or more process with the abnormal behavior and/or the suspicious activity. The analyzer module is further configured to advance the triggered investigation by requesting and analyzing the additional collection of data points, e.g. system data, metrics data, endpoint data, domain registration data, other anomalies occurring in the system, reasonableness in light of recent user activity to legitimately to connect to that endpoint connection, etc., to support or refute each of the one or more possible cyber threat hypotheses that could include the identified abnormal behavior and/or suspicious activity data with the agent analyzer data analysis process and the one or more AI models trained with machine learning on possible cyber threats. The additional collected data points are beyond the initial identified abnormal behavior, and/or a suspicious activity triggering the investigation.

After the starting point of the investigation of possible cyber threats due to the initial abnormal process behavior, then the analyzer module can then examine additional indicators and factors. The analyzer module can then examine additional indicators and factors to determine, for example, i) a score/numerical likelihood of how likely the abnormal process is malicious supported by facts and reasons and/or ii) that one or more hypotheses of potential cyber threats have been refuted with the accompanying data or lack thereof.

In the following examples the analyzer module uses multiple factors to the determination of whether a process is likely malicious.

Initially, the rare JA3 hash and/or rare user agent connections for this network coming from a new or unusual process are factored. These are quickly determined by referencing the one or more AI models trained with machine learning on the pattern of life of each device and its associated processes in the system. Next, the analyzer module can have an external input to ingest threat intelligence from other devices in the network cooperating with the cyber security appliance. For example, in terms of JA3, as it is increasingly used for threat intelligence, the analysis module may be able to ingest from third party sources and not just the internal data store of identified bad JA3 fingerprints. Another example factor analyzed can be—is the process running as a distinct process, and a deeper analysis of what are the characteristics of the range of distinct endpoints being connected to. Next, the analyzer module can look for other anomalies, such as model breaches, while the AI models trained on potential cyber threats can assist in examining and factoring other anomalies that have occurred over a given timeframe to see if a correlation exists between a series of two or more anomalies occurring within that time frame.

The analysis module can combine these IoCs (unusual network JA3, unusual device JA3, . . . ) with many other weak indicators to detect the earliest signs of an emerging threat, including previously unknown threats, without using strict blacklists or hard-coded thresholds.

The analysis module using the supervised machine learning makes the detection of domain fronting, without having to break up and break into encrypted traffic, possible by instead combining unusual JA3 detection with other anomalies, such as beaconing. This is a good trigger to start hunting for a domain fronting threat hunt.

A deeper analysis of the endpoint data can include things like the domain metadata itself that can reveal peculiarities and as such one or more indicators of potentially a malicious domain, such as its URL, then this could help confirm an analysis to determine that indeed a cyber threat has been detected. The analysis module can also look at factors of how rare the endpoint connection is, how old the endpoint is, where geographically the endpoint is located, how a security certificate associated with a communication is verified only by endpoint or by external $3^{rd}$ party, just to name a few additional factors. The analysis module can then assign weighting given to these factors in the machine learning that can be supervised based on how strongly that characteristic has been found to match up to actual malicious sites in the training.

The AI-based cyber analyst can catch malicious software and domain fronting with JA3. An example below is where analyzer module cooperating with the other modules and AI models detects a malicious C2 communication triggered by observing anomalous JA3 behavior. The unsupervised machine learning algorithms identified a desktop device using a JA3 that was 95-100% unusual for the network. The process connected to an external domain using a Let's Encrypt certificate, which, along with self-signed certificates, is often abused by malicious actors. As well as the JA3, the domain was also 90-100% rare for the network—essentially no other device visited that endpoint destination.

The analysis module can detect malicious processes. The unsupervised machine learning using JA3 hashing and/or user agent data can be leveraged as a powerful network behavioral indicator, an additional metric that can flag the use of unauthorized or risky software, or as a means of identifying emerging malware compromises in the initial stages of a C2 communication.

In this example, the malicious actor has registered a domain that is very similar to the victim's legitimate domain, for example, www.companyname[.]com (legitimate domain) vs. www.companyname[.]online (malicious domain). This was intentionally done to avoid suspicion and human analysis. Over a timeframe under analysis for example, a 7-day period, in a 2,000-device environment, the C2 communication to the external domain of www.companyname[.]online was the only time that the analysis module flagged unusual behavior of this kind.

As the C2 traffic was encrypted as a secured connection (therefore no intrusion detection was possible on the traffic's content payload) and the domain was not known as suspicious (not on reputation-based blacklisting), this C2 traffic would most likely remain undetected by the rest of the security stack.

Combining unsupervised machine learning with JA3 is incredibly powerful for the detection of domain fronting. Other factors can and are factored into a malicious determination. Domain fronting is merely an example popular technique to circumvent censorship and to hide C2 traffic. While some infrastructure providers take action to prevent domain fronting on their end, it is still prevalent and actively used by attackers.

Again, in an embodiment, the cyber-security appliance via the analysis module cooperating with the other modules and AI models can detect domain fronting on encrypted network traffic in transit via TLS/SSL inspection and use of JA3. This can be done without breaking up encrypted communication to inspect the clear-text payloads. This method does not require network restructuring and does not violate privacy issues—especially in the context of GDPR.

In step 7, the analyzer module generates one or more supported possible cyber threat hypotheses from the possible set of cyber threat hypotheses. The analyzer module generates the supporting data and details of why they hypothesis are supported. The analyzer module can also generate one or more possible cyber threat hypotheses and the supporting data and details of why they were refuted.

In step 8, an assessment module with the AI classifiers is configured to cooperate with analyzer module. The analyzer module can generate one or more supported possible cyber threat hypotheses from the possible set of cyber threat hypotheses as well as one or more refuted possible cyber threat hypotheses. The analyzer module generates the supporting data and details of why they hypothesis are supported. The assessment module with the AI classifiers cooperates with the AI model trained on possible cyber threats can make a determination on whether a cyber threat exists and what level of severity is associated with that cyber threat. The assessment module with the AI classifiers cooperates with the one or more AI models trained on possible cyber threats in order assign a numerical assessment of a given cyber threat hypothesis that was found likely to be supported by the analyzer module with the one or more data analysis processes, via the abnormal behavior, the suspicious activity, or the collection of system data points. The assessment module with the AI classifiers output can be a score, (ranked number system, probability, etc.) that a given identified process is likely a malicious process.

The assessment module with the AI classifiers can be configured to assign a numerical assessment, such as a probability, of a given cyber threat hypothesis that is supported and a threat level posed by that cyber threat hypothesis which was found likely to be supported by the analyzer module, which includes the abnormal behavior or suspicious activity as well as one or more of the collection of system data points, with the one or more AI models trained on possible cyber threats.

In step 9, the formatting module can generate an output such as a printed or electronic report with the relevant data. The formatting module can cooperate with both the analyzer module and the assessment module depending on what the user wants to be reported.

The formatting module is configured to format, present a rank for, and output one or more supported possible cyber threat hypotheses from the assessment module into a formalized report, from a one or more report templates populated with the data for that incident.

The formatting module is configured to format, present a rank for, and output one or more detected cyber threats from the analyzer module or from the assessment module into a formalized report, from a one or more report templates populated with the data for that incident. Many different types of formalized report templates exist to be populated with data and can be outputted in an easily understandable format for a human user's consumption.

The formalized report on the template is outputted for a human user's consumption in a medium of any of 1) printable report, 2) presented digitally on a user interface, 3) in a machine readable format for further use in machine-learning reinforcement and refinement, or 4) any combination of the three.

The formatting module is further configured to generate a textual write up of an incident report in the formalized report for a wide range of breaches of normal behavior, used by the AI models trained with machine learning on the normal behavior of the system, based on analyzing previous reports with one or more models trained with machine learning on assessing and populating relevant data into the incident report corresponding to each possible cyber threat.

The formatting module can generate a threat incident report in the formalized report from a multitude of a dynamic human-supplied and/or machine created templates corresponding to different types of cyber threats, each template corresponding to different types of cyber threats that vary in format, style, and standard fields in the multitude of templates. The formatting module can populate a given template with relevant data, graphs, or other information as appropriate in various specified fields, along with a ranking of a likelihood of whether that hypothesis cyber threat is supported and its threat severity level for each of the supported cyber threat hypotheses, and then output the formatted threat incident report with the ranking of each supported cyber threat hypothesis, which is presented digitally on the user interface and/or printed as the printable report.

In step 10, the assessment module with the AI classifiers, once armed with knowledge that malicious activity is likely occurring/is associated with a given process from the analyzer module, then cooperates with the autonomous response module to take an autonomous action such as i) deny access in or out of the device or the network and/or ii) shutdown activities involving a detected malicious agent.

The trigger module, analyzer module, assessment module, and formatting module cooperate to improve the analysis and formalized report generation with less repetition to consume CPU cycles with greater efficiency than humans repetitively going through these steps and re-duplicating steps to filter and rank the one or more supported possible cyber threat hypotheses from the possible set of cyber threat hypotheses.

Figure 2:
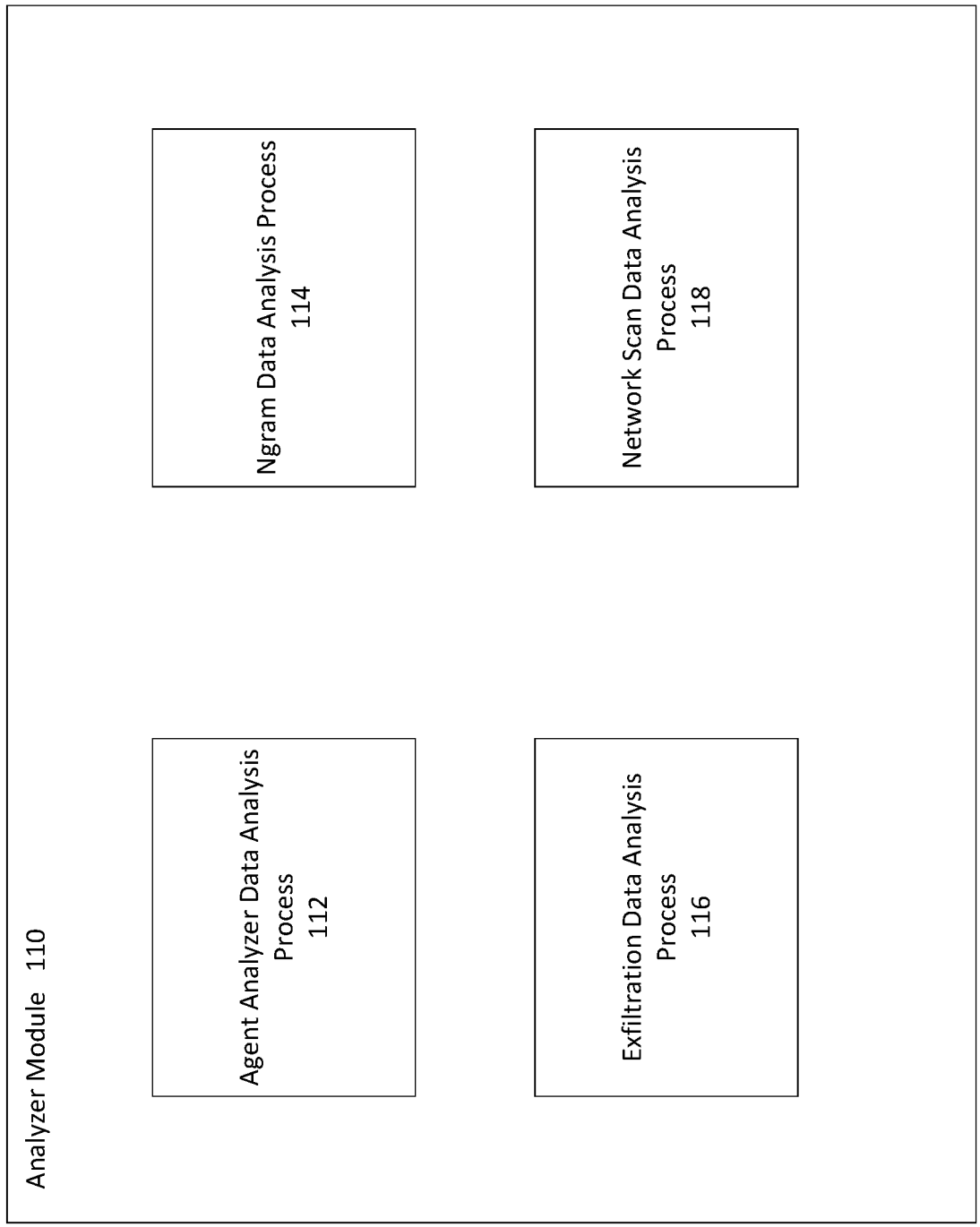
FIG. 2 illustrates a block diagram of an embodiment of an analyzer module that uses one or more data analysis processes including i) an agent analyzer data analysis process; ii) an Ngram data analysis process; iii) an exfiltration data analysis process; and iv) a network scan data analysis process.

Next, FIG. 2 illustrates a block diagram of an embodiment of an analyzer module uses one or more data analysis processes including i) an agent analyzer data analysis process; ii) an Ngram data analysis process; iii) an exfiltration data analysis process; and iv) a network scan data analysis process; in order to obtain any of the abnormal behavior and the suspicious activity to start the investigation on the possible set of cyber threats hypotheses, as well as, to obtain the collection of system data points to either support or refute the possible cyber threat hypotheses. The analyzer module 110 uses one or more data analysis processes including i) an agent analyzer data analysis process 112 trained to detect the cyber threat, previously unknown to the system, using either an 1) analysis of JA3 hashes when monitoring and analyzing a secured communication connection without needing to decrypt content in network traffic or 2) an analysis of user agent data when monitoring and analyzing an unsecured communication connection; ii) an Ngram data analysis process 114 trained to assess an address string under analysis to determine the address string's 1) similarity to or 2) anomaly from known good and bad populations of address strings; iii) an exfiltration data analysis process 116 trained to identify and correlate 1) data transfers to one or more online services as well as 2) data transfers to one or more other external network locations when multiple different Internet Protocol (IP) addresses exist for that online service or that other external network location; and iv) a network scan AI 118 classifier trained to create a virtual tree of IP address space to detect when abnormal scans of one or more IP address ranges occurs. The analyzer module employs the other three data analysis processes in a similar manner as the agent analyzer data analysis process discussed above. In reference to FIGS. 1A and 1B, the differences will be discussed below.

ii) Ngram Classification for String Assessment

The analyzer module may use an Ngram data analysis process to assess an address string under analysis to determine that address string's 1) similarity to or 2) anomaly from known good and bad populations of address strings factoring in at least how comprehensible are terms and characters in the address string under analysis to a human reviewing the terms and characters in the address string under analysis.

In step 6, an analyzer module can be configured to cooperate with the trigger module for the investigation to form one or more hypotheses on what are a possible set of cyber threats that could include the initially identified abnormal behavior and/or suspicious activity.

The analyzer module may use the Ngram data analysis process to at least one of i) identify the abnormal behavior, ii) identify the suspicious activity, iii) provide the additional system data points, and iv) any combination of these three, from the one or more entities in the system in order to start or further the investigation on the possible cyber threat hypotheses. Thus, the analyzer module using the Ngram data analysis process may cooperate with the cyber threat analyst module configured to form and investigate hypotheses on what are the possible set of cyber threats to start the investigation to form one or more hypotheses on what are the possible set of cyber threats that could include the initially identified abnormal behavior and/or suspicious activity, as well as, the analyzer module using the Ngram data analysis process may cooperate with the data store to gather system data points to support or refute the investigation on possible cyber threats.

The collection of data points, including data, metrics, and meta data, obtained from at least the Ngram data analysis process for address string assessment can be used to support or refute each of the one or more possible cyber threat hypotheses that could include the identified abnormal behavior and/or suspicious activity data with the one or more AI models trained with machine learning on possible cyber threats.

The analyzer module can start the investigation to form one or more hypotheses on what are a possible set of cyber threats and then goes through the investigation process by cooperating with the data store and AI models on normal behavior and AI models on potential cyber threats using the Ngram statistics.

The analyzer module can use the Ngram data analysis process to use Ngram statistics to determine string similarity and anomaly compared to known two or more (good and bad) populations of strings. The Ngram assessment can be on the sequence of N words and characters in an address string under analysis and then a probability of the sequence of N words and characters appearing in address strings being compared. As discussed above, user agents put identification information into their address string. Most Web browsers can use a User-Agent string value as the following example: Mozilla/[version] ([system and browser information]) [platform] ([platform details]) [extensions].

In another example, a domain name may have an address string identifying a realm of administrative autonomy within the Internet. Domain name address strings may have a top level domain of https://www.example.com and the string can further include additional text and character information when the string identifies sub domains within the top level domain: https://en.example.com/wiki/Domain_name#Domain_name_syntax Strings for various networking contexts can be analyzed. A first set of test strings such as known good domain names have a pattern of being easily comprehensible/make sense to a human in light of a given spoken human language. For example, a domain with example terms 'Example,' 'wiki,' 'domain,' 'name,' '.com' and 'syntax' make sense to a human in light of the English language. The human coder who created that address string of a good legitimate domain composed the address string with terms they and other could understand in the future. A second set of test strings such as known bad domain names associated with malicious sites, can have a pattern of terms not adhering or making sense in a spoken human language. For example, a domain with example terms 'Ex1m8le,' '$i$ki,' 'dom99n,' 'n134,' 'lt' and 's//t9x' does make much sense to a human. However, a malicious software agent has no need to understand the address string but rather merely looks for the one or more addresses written into its coding to which it is trying to communicate with and often hacker try to make these address strings obtuse and hard to understand for a human cyber analyst trying to protect against this malicious cyber threat. When a string under analysis is compared to 1) a first set of test strings of a first type, such as known good domain names, which have a pattern of being easily comprehensible/make sense to a human in light of a given spoken human language and 2) a second set of test strings of a second type such as known bad domain names associated with malicious sites, which have a pattern of not adhering or making sense in a spoken human language, then the Ngram classification can produce a result of which set (% likely Good or Bad) this string under analysis is more similar to. The Ngram data analysis process is useful for assessing a wide range of phenomena, from hostname maliciousness (used a second set of test strings of a second type) to SQL injection (e.g. code injection web hacking technique). Note, Ngram statistics can be a statistical analysis of text or speech content to find n (a number) of some sort of item in the text. The Ngram data analysis process's analysis further informs the analyzer module's conception of normal behavior of the network and device, and can be used to predict a nature of address strings, such as hostnames, emerging as part of everyday traffic.

Note, a User-Agent string format can be specified by section 5.5.3 of HTTP/1.1 Semantics and Content. The format of the User-Agent string in HTTP can be a list of terms with optional comments and characters for a format. For example, if a user's product were called WikiBrowser, their user agent string might be WikiBrowser/1.0 Gecko/1.0.

The parts of this address string may be as follows:
product name and version (WikiBrowser/1.0)
layout engine and version (Gecko/1.0)

The Ngram data analysis process uses Ngram to do scoring and output good or bad and can then receive supervised machine learning feedback from positive confirmations from the human cyber analyst during the deployment of the cyber security appliance.

iii) Identification of One or More Online Services or Other External Network Locations Having Data being Transferred to these One or More Online Services or Other External Network Locations by Correlating Multiple Different Types of Identifying Information to the Same Online Service or the Same External Network Location The analyzer module may use an exfiltration data analysis process to identify and correlate data transfers to one or more online services or other external network locations when multiple different IP address exist for those online services or other external network location by correlating multiple different types of identifying information to the same online service or the same external network location.

In step 6, the analyzer module may use the exfiltration data analysis process to at least one of i) identify the abnormal behavior, ii) identify the suspicious activity, iii) provide the additional system data points, and iv) any combination of these three, from one or more entities in the system in order to start and/or further the investigation on possible cyber threats.

The analyzer module using the exfiltration data analysis process may cooperate with the trigger module for the investigation to form one or more hypotheses on what are a possible set of cyber threats that could include the initially identified abnormal behavior and/or suspicious activity. The analyzer module with the exfiltration data analysis process may cooperate with the trigger module to detect each time an upload of data transfer over any of i) a set data volume such as a Megabyte size itself, ii) a set data volume of contents in a zip file, and iii) a set data volume of content in an embedded link, is occurring so that information about that data transfer, including data and meta data, is stored in the data store, and then analyzed with the exfiltration data analysis process in the analyzer module.

The additional collection of system data points includes data, metrics, and meta data, to support or refute each of the one or more possible cyber threat hypotheses that could include the identified abnormal behavior and/or suspicious activity with the one or more AI models trained with machine learning on possible cyber threats. The exfiltration data analysis process is configured to identify one or more online services or other external network locations. The analyzer module using the exfiltration data analysis process may cooperate with the data gathering module to seek out and supply the additional collection of system data points via the exfiltration data analysis process to identify one or more online services or other external network locations having data being transferred to these one or more online services or other external network locations by correlating multiple different types of identifying information to the same online service or the same external network location.

Data exfiltration to services, such as cloud storage, can often be to a wide range of IP addresses and connection endpoints, making it difficult to identify previous service usage; and thus, determine an anomaly, such as abnormal behavior or suspicious activity. For example storage services, Dropbox, WeTransfer, and Google Drive can all have a wide range of IP addresses associated with that particular online data storage service. In an example, an authorized backup of company data may occur many times over a week period to, for example, Dropbox and the upload of that backup data goes to a number of different IP address even though the all of the backup data is going to Dropbox. However, when an upload is observed, the domain endpoints can be identified, and compared to other endpoints contacted by the device. In addition, more information can be factored in than just endpoints contacted. As discussed, a domain name may have a string identifying a storage domain with many different IP addresses associated with that domain. The top level domain can be, for example, https://www.exampleDropbox.com and the string can further include additional text and character information when the string identifies sub domains within the top level domain: https://www.exampleDropbox.com/home/October%20event%/preview=veo.com_url A first IP address may be, for example, a set of 4 numbers, such as 112.200.200.163 (e.g. 112, 200, 200, and 163) and a second IP address for a server and storage located in another country for the same domain would have a different set of 4 numbers. To help identify locations where data is being sent to, the data analysis process may look at each IP address and in addition other factors such as endpoints in same domain, similar wording in the address string for the domain name, etc., in order to aggregate all of the uploads of data (even though two or more of the data transfers are going to distinctly different IP addresses) going to a particular online service or other external network location over a set time frame.

The information about that data transfer, including data and meta data, can be stored in a data store and analyzed with the exfiltration data analysis process in the analyzer module. The set megabyte size can be set by the user, at a level such as 10 megabytes or more. In addition, the exfiltration data analysis process can be configured with one or more routines that are coded to get access to any zipped files and embedded links in the data volume being exfiltrated, and then assess the volume of data, such as megabyte size, of the enclosed documents. A data gathering module can cooperate with the trigger module to retrieve metadata and any other information each time an upload of data transfer is detected.

The data analysis process has an association function to retrieve metadata and any other information to identify a particular entity with each upload connection correlating properties of a same entity (e.g. JA3, user agent, similar words and terms found in a host name/domain name of each different IP addresses, ASN, IP name, server, etc.). All of this information is stored in the data store. The exfiltration data analysis process analyzes to see when there is a substantial overlap of these common properties correlate then a determination can be made on whether all of these uploads connect to a same entity. Note, an additional analysis of each entity identified from the connections can give a characterization of data transferred to an external service. For example, a simple search engine search of the name of the entity can provide information on the nature and legitimacy/or maliciousness of that entity.

The exfiltration data analysis process can use a grouping function to group connections from uploads with shared properties correlating a same entity.

The exfiltration data analysis process has an aggregating upload function to check to see how many uploads are occurring within a similar time frame and then aggregate the total amount uploaded so uploads in small chunks to a same entity with the correlated shared properties do not fly under the threshold of the set megabyte size to escape analysis. The aggregating upload function can also aggregate all uploads going to a same entity over a specified period of time. Note, an additional analysis of each entity identified from the connections can give a characterization of data transferred to an external service.

The exfiltration data analysis process cooperates with the data store to look back over stored historical data and metadata.

The exfiltration data analysis process can check whether this user or device has connected and uploaded data to that entity before via referencing the shared properties to the historical records in the data store. If this is a new entity that has not been uploaded to before, then that can further raise a possible maliciousness to the current upload. Also, if the overall volume of data uploaded is significantly above the set point and/or is uploading from a sensitive data area, then that can further raise a possible maliciousness to the current upload.

Thus, the exfiltration data analysis process can identify one or more online services or other external network locations having data being transfer to these one or more online services or other external network locations by correlating multiple different types of identifying information to the same online service or the same external network location. A report on the external transfers occurring to online services or other external network locations can be generated. In addition, the assessment module can communicate with the exfiltration data analysis process and an autonomous response module to take an autonomous action to mitigate the data transfer can be triggered.

This is a way of breaking down total amounts of data transfer coming from a specific device and/or a specific user into smaller portions of that total amount allocated to specific online services and other external network locations. The multiple data transfers are checked to see if all of these different IP addresses during this time frame belong to a same online service and other external network location.

The correlated identifying information and characterization of data transferred to an external service based on the overlapping shared properties by its endpoints by the exfiltration data analysis process, allows for analysis of its current and past usage by the source device. Thus, identification of different services such as Dropbox or a malicious server, can have a number of data exfiltration processes grouped together to correlate different identifying information as belonging to a same entity where the data is being externally transferred to. The exfiltration data analysis process can better identify use of legitimate cloud storage services as part of the normal pattern of life versus anomalous activity. Modelling and analysis of a data storage site's endpoints and other identifying information belonging to a same entity that is having data sent to it by a particular device and/or particular user allows the exfiltration data analysis process to better identify use of legitimate cloud storage services as part of the normal pattern of life versus anomalous activity that may indicate data exfiltration or a download prompted by a malware infection. When the different identifying information is correlated to belonging to a same entity, then determinations can occur of how much data is being transferred to this entity, how often data is being transferred to this entity, etc.

This analysis can be applied in network environments as well as SaaS and cloud environments.

This analysis can be integrated with anomaly detection to better inform a given event's rarity scoring/normal behavior detection.

iv) Network Scan Data Analysis Process to Create a Virtual Tree of IP Address Space to Detect when Abnormal Scans of One or More IP Address Ranges Occurs Via Node Entropy In step 6, the analyzer module may use a network scan data analysis process to at least one of i) identify the abnormal behavior, ii) identify the suspicious activity, iii) provide the additional system data points and iv) any combination of these three, from one or more entities in the system in order to start or further the investigation on possible cyber threats. The analyzer module using the network scan data analysis process may cooperate with the trigger module for the investigation to form one or more hypotheses on what are a possible set of cyber threats that could include the initially identified abnormal behavior and/or suspicious activity.

The collection of system data points, including data, metrics, and meta data, can support or refute each of the one or more possible cyber threat hypotheses that could include the identified abnormal behavior and/or suspicious activity. The possible cyber threat hypotheses that could include the identified abnormal behavior and/or suspicious activity data may include a person or malicious agent trying to figure out devices connected to the network in that range of IP addresses, or possibly identify a misconfiguration of a particular device in the network.

The network scan data analysis process may perform a following sequence of steps.

1. The network scan data analysis process may create a virtual tree of IP address space to detect when abnormal scans of one or more IP address ranges occur in the network being protected by the cyber security appliance. In the virtual tree of IP address space, each node can represent an IP address range, or Classless Inter-Domain Routing (CIDR) address range, and contain a number of IP addresses that attempted connections have been made to but the network connections have failed.
The network scan data analysis process cooperates with the data store i) to calculate and store the node entropy for each node, and ii) then to look for a change in node entropy from its calculation, which will indicate that most likely this node of IP addresses has been recently scanned.

2. The network scan data analysis process may look for these failed network connections, which can then be correlated to what IP addresses have been scanned in i) a reconnaissance mission by a person or malicious agent trying to figure out devices connected to the network in that range of IP addresses, or ii) possibly identify a misconfiguration of a particular device newly configured, newly installed or newly worked on in the network.

3. The network scan data analysis process may move through the nodes of the tree, from a top node to a bottom node of the tree, and calculate entropy for that node (e.g. range of IP addresses). In an example entropy function: Entropy=(Boltzmann's constant k)×logarithm of number of possible states; and thus, S=k B log W. Another example entropy function could be: p log p, where p is the probability of being in a given branch. Importantly, each node or at least a set of nodes has its entropy calculated, and then stored in the data store.

4. The network scan data analysis process may look for a change, such as a rise, in entropy from its calculation, which will indicate that this node of IP addresses most likely has been recently scanned. The network scan data analysis process can be configured to go up one node past and then down one node past the last node with a change in entropy so that the classifier can infer the total range of IP addresses scanned. When a range of IP addresses are being scanned unexpectedly, then that can be identified and detected as abnormal behavior and/or suspicious activity as well as additional a system data point to start or advance an investigation.

5. Thus, the network scan data analysis process can determine what set/range of IP addresses or at least IP address prefixes are likely being scanned. If the IT professionals operating that network have not taken actions to scan the network addresses, then the scan likely was conducted by a possible cyber threat.

6. The network scan data analysis process will feed the set/range of IP addresses being scanned to another classifier in the analyzer module. This network scan data analysis process may use machine learning to take in as inputs: the set/range of IP addresses, along with other inputs—of port, and number of active device scans over a set time period, and any other unusual activity during this timeframe and/or within the set/range of IP addresses. This network scan data analysis process will take in all of these inputs and then output interesting/unusual IP address scans.

7. The report generated will indicate IP address ranges that are interesting/unusual being scanned, and when the system and/or the human security team is not generating these scans that can be a heavy indicator of something malicious going on. These interesting/unusual scans of IP ranges could indicate a misconfiguration of a network device recursively trying to find other network connections. By examining an input of whether a new device has been installed or recently been worked on by humans, the analyzer module can figure out what IP addresses are being scanned against any legitimate reasons for them to be scanned, in order to determine when a misconfiguration of a device is occurring as well as whether a malicious software agent is directing the network scan.

The network scan data analysis process is configured to understand various system protocols and address formatting within those protocols. For example, Internet Protocol version 4 (IPv4) and Internet Protocol version 6 (IPv6) can be example core protocol of standards-based internetworking methods in the Internet and other packet-switched networks. The address ranges defined by these protocol standards can be mapped to nodes in the tree. In the case of network scanning for IPv4, this tree is IPv4 space, with each node representing a Classless Inter-Domain Routing (CIDR) address range, and containing a number of IP addresses that attempted connections have been made to.

In an alternative use case of directory enumeration, this tree is the directory structure, with each node representing a leaf in the directory, and containing a number of accessed files. The directory enumeration can relate to enumerating files and directories on a file system.

In both of the above cases, the key nodes of interest can be identified by recursively searching this tree, and computing the entropy of each node, storing any nodes where large increases in entropy are seen, since these bests describe the majority of the data. As part of a malicious attack, a malicious agent may attack to network scan to detect new routes of infection or attempt directory enumeration to spread across the directory space. A fuller analysis of the network scan activity on a range of IP addresses allows the network scan data analysis process to track an initial reconnaissance mission by a malicious agent and identify potential further victims of an attack. Likewise, a fuller analysis of the directory enumeration on the enumerated files and directories allows the network scan data analysis process to track an initial reconnaissance mission by a malicious agent and identify potential further victims of an attack.

The AI-based cyber analyst component provides an advantage over competitors' products as it reduces the time taken for cybersecurity investigations, provides an alternative to manpower for small organizations and improves detection (and remediation) capabilities within the cyber security platform.

The AI-based cyber analyst performs its own computation of threat and identifies interesting network events with one or more processors. These methods of detection and identification of threat all add to the above capabilities that make the AI-based cyber analyst a desirable part of the cyber security platform. The AI-based cyber analyst offers a method of prioritizing which is not just a summary or highest score alert of an event evaluated by itself equals the most bad, and prevents more complex attacks being missed because their composite parts/individual threats only produced low-level alerts.

Figure 3:
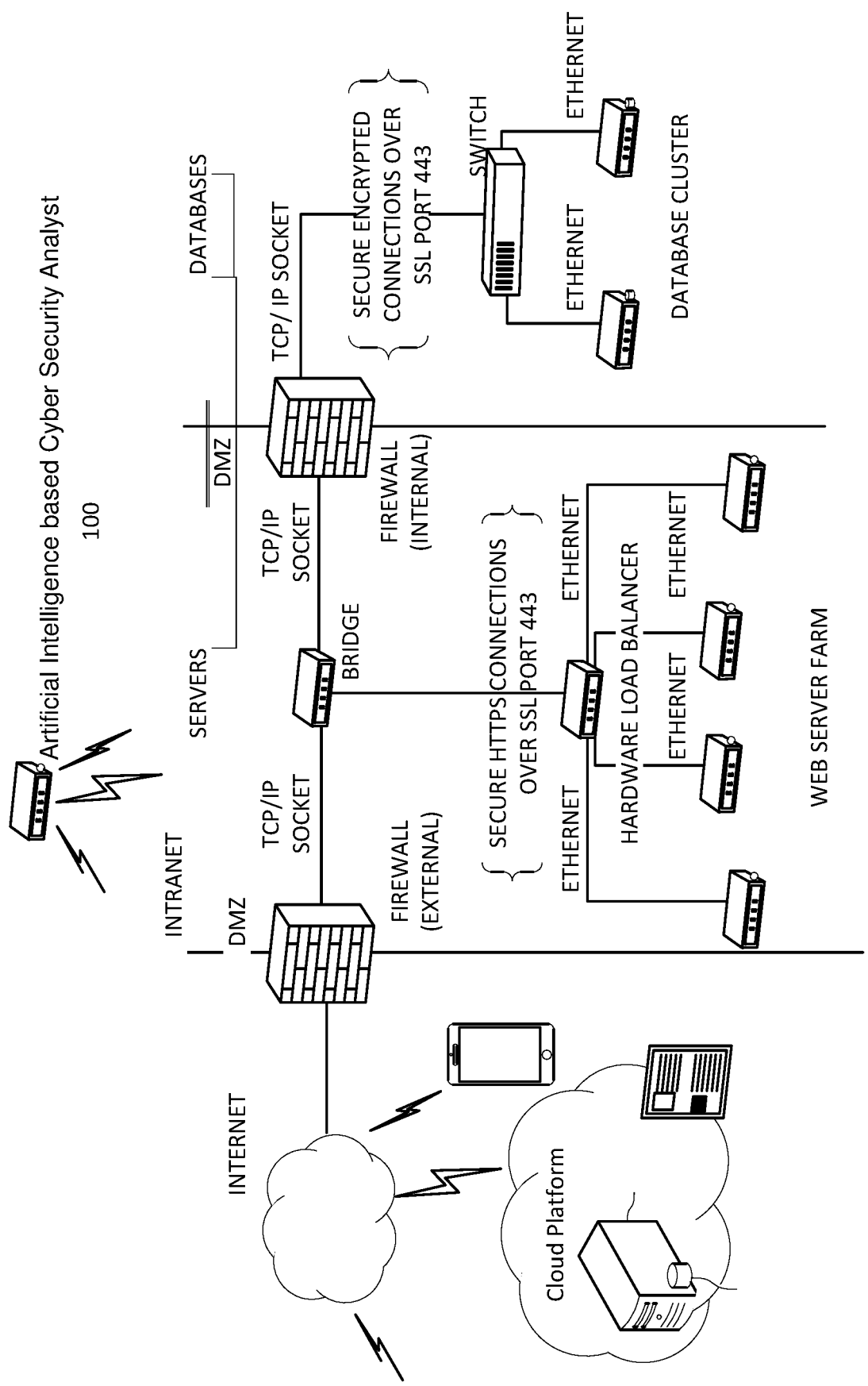
FIG. 3 illustrates a block diagram of an embodiment of the AI based cyber threat analyst plugging in as an appliance platform to protect a system.

FIG. 3 illustrates a block diagram of an embodiment of the AI based cyber threat analyst 100 plugging in as an appliance platform to protect a system.

Figure 4:
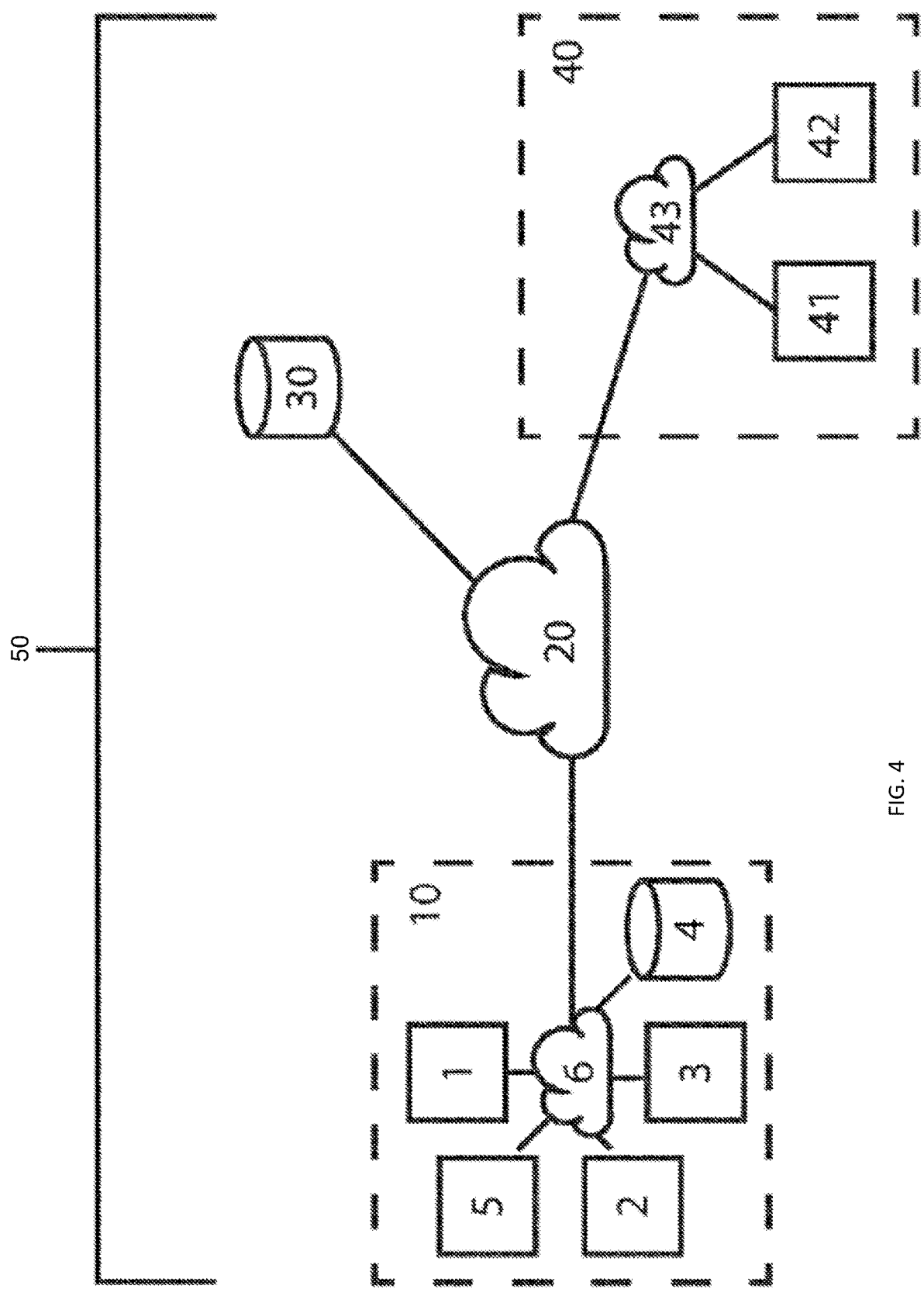
FIG. 4 illustrates an example cyber threat defense system using an AI based cyber threat analyst to protect an example network.

FIG. 4 illustrates an example cyber threat defense system using an AI based cyber threat analyst 100 to protect an example network. The example network of computer systems 50 uses a cyber security appliance. The system depicted is a simplified illustration, which is provided for ease of explanation. The system 50 comprises a first computer system 10 within a building, which uses the threat detection system to detect and thereby attempt to prevent threats to computing devices within its bounds.

The first computer system 10 comprises three computers 1, 2, 3, a local server 4, and a multifunctional device 5 that provides printing, scanning and facsimile functionalities to each of the computers 1, 2, 3. All of the devices within the first computer system 10 are communicatively coupled via a Local Area Network 6. Consequently, all of the computers 1, 2, 3 are able to access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices 18 including server 30 and second computer system 40. The second computer system 40 also includes two computers 41, 42, connected by a second LAN 43.

In this exemplary embodiment of the cyber security appliance, computer 1 on the first computer system 10 has the cyber security appliance with the AI based cyber threat analyst; and therefore, runs threat detection for detecting threats to the first computer system. As such, the computer system includes one or more processors arranged to run the steps of the process described herein, memory storage components required to store information related to the running of the process, as well as a network interface for collecting the required information.

The cyber security appliance in computer 1 builds and maintains a dynamic, ever-changing model of the 'normal behavior' of each user and machine within the system 10. The approach is based on Bayesian mathematics, and monitors all interactions, events and communications within the system 10—which computer is talking to which, files that have been created, networks that are being accessed.

For example, computer 2 is based in a company's San Francisco office and operated by a marketing employee who regularly accesses the marketing network, usually communicates with machines in the company's U.K. office in second computer system 40 between 9.30 AM and midday, and is active from about 8:30 AM until 6 PM.

The same employee virtually never accesses the employee time sheets, very rarely connects to the company's Atlanta network and has no dealings in South-East Asia. The threat detection system takes all the information that is available relating to this employee and establishes a 'pattern of life' for that person and the devices used by that person in that system, which is dynamically updated as more information is gathered. The 'normal' model is used as a moving benchmark, allowing the system to spot behavior on a system that seems to fall outside of this normal pattern of life, and flags this behavior as anomalous, requiring further investigation.

The cyber security appliance is built to deal with the fact that today's attackers are getting stealthier and an attacker/malicious agent may be 'hiding' in a system to ensure that they avoid raising suspicion in an end user, such as by slowing their machine down.

The cyber threat defense system builds a sophisticated 'pattern of life'—that understands what represents normality for every person, device, and network activity in the system being protected by the cyber security appliance.

The cyber security appliance can use unsupervised machine learning to works things out without pre-defined labels. In the case of sorting a series of different entities, such as animals, the system analyzes the information and works out the different classes of animals. This allows the system to handle the unexpected and embrace uncertainty when new entities and classes are examined. The system does not always know what it is looking for, but can independently classify data and detect compelling patterns.

The cyber security appliance's unsupervised machine learning methods do not require training data with pre-defined labels. Instead, they are able to identify key patterns and trends in the data, without the need for human input. The advantage of unsupervised learning in this system is that it allows computers to go beyond what their programmers already know and discover previously unknown relationships. The unsupervised machine learning methods can use a probabilistic approach based on a Bayesian framework. The machine learning allows the cyber security appliance to integrate a huge number of weak indicators/low threat values by themselves of potentially anomalous network behavior to produce a single clear overall measure of these correlated anomalies to determine how likely a network device is to be compromised. This probabilistic mathematical approach provides an ability to understand important information, amid the noise of the network—even when it does not know what it is looking for.

The cyber security appliance can use a Recursive Bayesian Estimation. To combine these multiple analyses of different measures of network behavior to generate a single overall/comprehensive picture of the state of each device, the cyber security appliance takes advantage of the power of Recursive Bayesian Estimation (RBE) via an implementation of the Bayes filter.

Using RBE, the cyber security appliance's AI models are able to constantly adapt themselves, in a computationally efficient manner, as new information becomes available to the system. The cyber security appliance's AI models continually recalculate threat levels in the light of new evidence, identifying changing attack behaviors where conventional signature based methods fall down.

Training a model can be accomplished by having the model learn good values for all of the weights and the bias for labeled examples created by the system, and in this case; starting with no labels initially. A goal of the training of the model can be to find a set of weights and biases that have low loss, on average, across all examples.

An anomaly detection technique that can be used is supervised anomaly detection that requires a data set that has been labeled as "normal" and "abnormal" and involves training a classifier. Another anomaly detection technique that can be used is an unsupervised anomaly detection that detects anomalies in an unlabeled test data set under the assumption that the majority of the instances in the data set are normal, by looking for instances that seem to fit least to the remainder of the data set. The model representing normal behavior from a given normal training data set can detect anomalies by establishing the normal pattern and then test the likelihood of a test instance under analysis to be generated by the model. Anomaly detection can identify rare items, events or observations which raise suspicions by differing significantly from the majority of the data, which includes rare objects as well as things like unexpected bursts in activity.

The method and system are arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor memory or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit.

Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, Java, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both.

Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

The invention claimed is:

1. An Artificial Intelligence (AI) based cyber threat analyst that is configured to protect a system, including but not limited to a network, comprising:
    one or more AI models trained with machine learning on a normal pattern of life in the system, configured to be used to identify at least one of i) an abnormal behavior, ii) a suspicious activity, and iii) any combination of both, from one or more entities in the system;

an analyzer module configured with one or more data analysis processes to cooperate with one or more AI classifiers in an assessment module by producing features for the AI classifiers;

where the analyzer module with the one or more data analysis processes is configured to cooperate with the one or more AI models trained with machine learning on the normal pattern of life in the system, to identify at least one of i) the abnormal behavior, ii) the suspicious activity, and iii) the combination of both, from one or more entities in the system;

a cyber threat analyst module is configured to use i) one or more AI models to form and investigate hypotheses, ii) a set of scripts to form and investigate hypotheses, and iii) any combination of both, in order to form and investigate hypotheses on what are a possible set of cyber threats, where the cyber threat analyst module to form and investigate hypotheses on what are a possible set of cyber threats is configured to use any of i) one or more AI models to form and investigate hypotheses trained with supervised machine learning on human-led cyber threat investigations and then steps, data, metrics, and meta data on how to support or to refute the hypotheses on what are a possible set of cyber threats, ii) the set of scripts to form and investigate hypotheses to aid in how to form the hypotheses on what are a possible set of cyber threats and then the steps, data, metrics, and meta data to collect additional system data points to support or to refute the possible cyber threat hypotheses, and iii) any combination of both;

where the cyber threat analyst module with the set of scripts and/or AI models to form and investigate hypotheses on what are a possible set of cyber threats hypotheses is configured to cooperate with the analyzer module with one or more data analysis processes to conduct an investigation on the set of cyber threats hypotheses that would include the at least one of i) the abnormal behavior, ii) the suspicious activity, and iii) any combination of both, identified through cooperation with the one or more AI models trained with machine learning on the normal pattern of life in the system;

where the analyzer module is further configured to use the one or more data analysis processes selected from a group consisting of i) an agent analyzer data analysis process configured to detect the cyber threat, previously unknown to the system, using either an 1) analysis of JA3 hashes when monitoring and analyzing a secured communication connection without needing to decrypt content in network traffic or 2) an analysis of user agent data when monitoring and analyzing an unsecured communication connection; ii) an Ngram data analysis process configured to assess an address string under analysis to determine the address string's 1) similarity to or 2) anomaly from known good and bad populations of address strings; iii) an exfiltration data analysis process configured to identify and correlate 1) data transfers to one or more online services as well as 2) data transfers to one or more other external network locations when multiple different Internet Protocol (IP) addresses exist for that online service or that other external network location; and iv) a network scan data analysis process configured to create a virtual tree of IP address space to detect when abnormal scans of one or more IP address ranges occurs;

in order to obtain any of the abnormal behavior and the suspicious activity to start the investigation on the possible set of cyber threats hypotheses, as well as, to obtain the collection of system data points to either support or refute the possible cyber threat hypotheses;

where the assessment module with the AI classifiers is configured to cooperate with one or more AI models trained on possible cyber threats in order assign a numerical assessment of a given cyber threat hypothesis that was found likely to be supported by the analyzer module with the one or more data analysis processes, via the abnormal behavior, the suspicious activity, or the collection of system data points; and a formatting module configured to format, present, and output one or more supported possible cyber threat hypotheses as well as one or more refuted possible cyber threat hypotheses from any of the analyzer module and the assessment module into a formalized report, from a first template of a plurality of report templates, that is outputted for a human user's consumption in a medium of any of 1) printable report, 2) presented digitally on a user interface, 3) in a machine readable format for further use in machine-learning reinforcement and refinement, or 4) any combination of the three, where when any software instructions are implemented in the analyzer module, the cyber threat analyst module, the assessment module, and the formatting module, then the software instructions are stored in an executable form in one or more memories and are configured to be executed by one or more processors.

2. The AI-based cyber threat analyst of claim 1, where the analyzer module is configured to use the Ngram data analysis process to at least one of i) identify the abnormal behavior, ii) identify the suspicious activity, iii) provide the additional system data points, and iv) any combination of these three, from the one or more entities in the system in order to start or further the investigation on the possible cyber threat hypotheses; and thus, the analyzer module using the Ngram data analysis process is configured to cooperate with the cyber threat analyst module configured to form and investigate hypotheses on what are the possible set of cyber threats to start the investigation to form one or more hypotheses on what are the possible set of cyber threats that could include the initially identified abnormal behavior and/or suspicious activity, as well as, where the analyzer module using the Ngram data analysis process is configured to cooperate with a data store to gather system data points to support or refute the investigation on possible cyber threats, where the Ngram data analysis process is configured to assess an address string under analysis to determine that address string's 1) similarity to or 2) anomaly from known good and bad populations of address strings, factoring in at least how comprehensible are terms and characters in the address string under analysis to a human reviewing the terms and characters in the address string under analysis.

3. The AI-based cyber threat analyst of claim 1, where the analyzer module is configured to use the agent analyzer data analysis process to at least one of i) identify the abnormal behavior, ii) identify the suspicious activity, iii) provide the additional system data points, and iv) any combination of these three, from the one or more entities in the system in order to at least one of 1) start and 2) further the investigation on the possible cyber threat hypotheses; and thus, 1) the analyzer module using the agent analyzer data analysis process is configured to cooperate with the cyber threat analyst module configured to form and investigate hypotheses on what are the possible set of cyber threats in order to start the investigation to form one or more hypotheses on what are the possible set of cyber threats that could include the initially identified abnormal behavior and/or suspicious activity, as well as, 2) where the analyzer module using the agent analyzer data analysis process is configured to cooperate with a data store to gather system data points to support or refute the investigation on possible cyber threats, where the agent analyzer data analysis process is configured on malicious agent detection using either an analysis of i) JA3 hashes when monitoring and analyzing a secured encrypted connection to an endpoint connection without needing to decrypt content in network traffic, and ii) an analysis of user agent data when monitoring and analyzing an unsecured connection to the endpoint connection, factoring in at least how rare is it for 1) a process, 2) a device, or 3) both to connect to the endpoint connection from this network.

4. The AI-based cyber threat analyst of claim 3, where a process identifier module is configured to identify and track each process and device in the network making communication connections, where the agent analyzer data analysis process in the analyzer module is configured to cooperate with the process identifier module to identify all of the additional factors of i) are one or more processes running independent of other processes, ii) are the one or more processes running independent are recent to this network, and iii) are the one or more processes running independent connect to the endpoint, which the endpoint is a rare connection for this network, which are referenced and compared to one or more AI models trained with machine learning on the normal behavior of the pattern of life of the system, where the process identifier module cooperating with the agent analyzer data analysis process is configured to apply a JA3 hash function to network traffic transiting over the secure communication connection and/or perform an analysis of user agent data to network traffic transiting over the unsecure communication connection in order to generate process connection fingerprints, which can also be stored in the data store, where the process connection fingerprints contain multiple characteristics of the endpoint connection, where when any software instructions are implemented in the process identifier module, then the software instructions are stored in an executable form in one or more memories and are configured to be executed by one or more processors.

5. The AI-based cyber threat analyst of claim 3, where the analyzer module is further configured to analyze all endpoint connections split up by JA3 hashes or user agent data by similarity to each other, where the analyzer module is configured to group similar JA3 connections or user agent data and separate them out in multiple groups in order to analyze the smaller groups of similar i) JA3 connections individually linked to each distinct process range of distinct connection endpoints or ii) user agent data individually linked to each distinct process' user agent data for the range of distinct connection endpoints.

6. The AI-based cyber threat analyst of claim 3, where the analyzer module is further configured to conduct the investigation and make a final decision that need not be a positive determination that a cyber threat has been detected but rather a determination that something interesting is occurring in the system, where the something interesting can be a possible cyber threat but at least one of i) should be brought to an attention of a human cyber security analysis and ii) further warrants a more in-depth cyber threat investigation with the one or more AI models trained on potential cyber threats, where the one or more AI models trained on potential cyber threats and the assessment module with the AI classifiers cooperate to determine that a cyber-attack is occurring and assign the numerical assessment of a most likely cyber threat hypothesis that is occurring, which is indicative of a severity of the cyber-attack underway.

7. The AI-based cyber threat analyst of claim 1, where the analyzer module is configured to use the exfiltration data analysis process to at least one of i) identify the abnormal behavior, ii) identify the suspicious activity, iii) provide the additional system data points, and iv) any combination of these three, from one or more entities in the system in order to start and/or further the investigation on possible cyber threats, where the analyzer module using the exfiltration data analysis process is configured to cooperate with the cyber threat analyst module configured to form and investigate hypotheses on what are the possible set of cyber threats to start the investigation to form one or more hypotheses on what are the possible set of cyber threats that could include the initially identified abnormal behavior and/or suspicious activity, as well as, where the analyzer module using the exfiltration data analysis process is configured to cooperate with a data store to gather system data points to support or refute the investigation on possible cyber threats, where the exfiltration data analysis process is configured to identify and correlate data transfers to one or more online services or other external network locations when multiple different IP address exist for that online services or other external network location by correlating multiple different types of identifying information to the same online service or the same external network location.

8. The AI-based cyber threat analyst of claim 7, where the analyzer module with the exfiltration data analysis process is configured to cooperate with the trigger module to detect each time an upload of data transfer over any of i) a set megabyte size itself, ii) a set megabyte size of contents in a zip file, and iii) a set megabyte size of content in an embedded link, is occurring so that information about that data transfer, including data and meta data, is stored in the data store, and then analyzed with the exfiltration data analysis process in the analyzer module.

9. The AI-based cyber threat analyst of claim 1, where the analyzer module is configured to use the network scan data analysis process to at least one of i) identify the abnormal behavior, ii) identify the suspicious activity, iii) provide the additional system data points and iv) any combination of these three, from one or more entities in the system in order to start or further the investigation on possible cyber threats, where the analyzer module using the network scan data analysis process is configured to cooperate with the cyber threat analyst module configured to form and investigate hypotheses on what are the possible set of cyber threats to start the investigation to form one or more hypotheses on what are the possible set of cyber threats that could include the initially identified abnormal behavior and/or suspicious activity, as well as, where the analyzer module using the network scan data analysis process is configured to cooperate with the data store to support or refute the investigation on possible cyber threats, where the network scan data analysis process is configured to create a virtual tree of IP address space to detect when abnormal scans of one or more IP address ranges occurs via node entropy.

10. The AI-based cyber threat analyst of claim 9, the network scan data analysis process is further configured such that each node in the virtual tree of IP address space represents an IP address range, where the network scan data analysis process is configured to cooperate with the data store to calculate and store the node entropy for each node, and then to look for a change in node entropy from its calculation, which will indicate that most likely this node of IP addresses has been recently scanned.

11. A method for an Artificial Intelligence (AI) based cyber threat analyst to protect a system, including but not limited to a network, comprising:

using an analyzer module with one or more data analysis processes to cooperate with one or more AI classifiers in an assessment module by producing features for the AI classifiers;

using the analyzer module with the one or more data analysis processes to cooperate with one or more AI models trained with machine learning on a normal pattern of life in the system, to identify at least one of i) an abnormal behavior, ii) a suspicious activity, and iii) the combination of both, from one or more entities in the system;

using a cyber threat analyst module that has i) one or more AI models to form and investigate hypotheses, ii) a set of scripts to form and investigate hypotheses, and iii) any combination of both, to form and investigate hypotheses on what are a possible set of cyber threats, where the cyber threat analyst module to form and investigate hypotheses on what are possible set of cyber threats is configured to use any of i) one or more AI models to form and investigate hypotheses trained with supervised machine learning on human-led cyber threat investigations and then steps, data, metrics, and meta data on how to support or to refute the hypotheses on what are possible set of cyber threats, ii) the set of scripts to form and investigate hypotheses in order to aid in how to form the hypotheses on what are possible set of cyber threats and then the steps, data, metrics, and meta data to collect additional system data points to support or to refute a possible cyber threat hypotheses, and iii) any combination of both;

using the cyber threat analyst module with the set of scripts and/or AI models to form and investigate hypotheses on what are possible set of cyber threats hypotheses with the analyzer module with the one or more data analysis processes to conduct an investigation on the possible set of cyber threats hypotheses that would include the at least one of i) the abnormal behavior, ii) the suspicious activity, and iii) any combination of both, identified through cooperation with the one or more AI models trained with machine learning on the normal pattern of life in the system;

where the analyzer module is further configured to use the one or more data analysis processes selected from a group consisting of i) an agent analyzer data analysis process configured to detect the cyber threat, previously unknown to the system, using either an 1) analysis of JA3 hashes when monitoring and analyzing a secured communication connection without needing to decrypt content in network traffic or 2) an analysis of user agent data when monitoring and analyzing an unsecured communication connection; ii) an Ngram data analysis process configured to assess an address string under analysis to determine the address string's 1) similarity to or 2) anomaly from known good and bad populations of address strings; iii) an exfiltration data analysis process configured to identify and correlate 1) data transfers to one or more online services as well as 2) data transfers to one or more other external network locations when multiple different Internet Protocol (IP) addresses exist for that online service or that other external network location; and iv) a network scan data analysis process configured to create a virtual tree of IP address space to detect when abnormal scans of one or more IP address ranges occurs;

in order to obtain any of the abnormal behavior and the suspicious activity to start the investigation on the possible set of cyber threats hypotheses, as well as, to obtain the collection of system data points to either support or refute the possible cyber threat hypotheses;

using the assessment module with the AI classifiers cooperating with one or more AI models trained on the possible cyber threats in order assign a numerical assessment of a given cyber threat hypothesis that was found likely to be supported by the analyzer module with the one or more data analysis processes, via the abnormal behavior, the suspicious activity, or the collection of system data points; and using a formatting module to format, present, and output one or more supported possible cyber threat hypotheses as well as one or more refuted possible cyber threat hypotheses from any of the analyzer module and the assessment module into a formalized report, from a first template of a plurality of report templates, that is outputted for a human user's consumption in a medium of any of 1) printable report, 2) presented digitally on a user interface, 3) in a machine readable format for further use in machine-learning reinforcement and refinement, or 4) any combination of the three.

12. The method of claim 11, where the analyzer module uses the Ngram data analysis process to at least one of i) identify the abnormal behavior, ii) identify the suspicious activity, iii) provide the additional system data points, and iv) any combination of these three, from the one or more entities in the system in order to start or further the investigation on the possible cyber threat hypotheses; and thus, the analyzer module using the Ngram data analysis process is configured to cooperate with the cyber threat analyst module configured to form and investigate hypotheses on what are the possible set of cyber threats to start the investigation to form one or more hypotheses on what are the possible set of cyber threats that could include the initially identified abnormal behavior and/or suspicious activity, as well as, where the analyzer module using the Ngram data analysis process cooperates with the data store to gather system data points to support or refute the investigation on possible cyber threats, where the Ngram data analysis process is configured to assess an address string under analysis to determine that address string's 1) similarity to or 2) anomaly from known good and bad populations of address strings, factoring in at least how comprehensible are terms and characters in the address string under analysis to a human reviewing the terms and characters in the address string under analysis.

13. The method of claim 11, where the analyzer module uses the agent analyzer data analysis process to at least one of i) identify the abnormal behavior, ii) identify the suspicious activity, iii) provide the additional system data points, and iv) any combination of these three, from the one or more entities in the system in order to at least one of 1) start and 2) further the investigation on the possible cyber threat hypotheses; and thus, 1) the analyzer module using the agent analyzer data analysis process is configured to cooperate with the cyber threat analyst module configured to form and investigate hypotheses on what are the possible set of cyber threats in order to start the investigation to form one or more hypotheses on what are the possible set of cyber threats that could include the initially identified abnormal behavior and/or suspicious activity, as well as, 2) where the analyzer module using the agent analyzer data analysis process is configured to cooperate with a data store to gather system data points to support or refute the investigation on possible cyber threats, where the agent analyzer data analysis process is configured on malicious agent detection using either an analysis of i) JA3 hashes when monitoring and analyzing a secured encrypted connection to an endpoint connection without needing to decrypt content in network traffic, and ii) an analysis of user agent data when monitoring and analyzing an unsecured connection to the endpoint connection, factoring in at least how rare is it for 1) a process, 2) a device, or 3) both to connect to the endpoint connection from this network.

14. The method of claim 13, further comprising:
using a process identifier module to identify and track each process and device in the network making communication connections, where the agent analyzer data analysis process in the analyzer module cooperates with the process identifier module to identify all of the additional factors of i) are one or more processes running independent of other processes, ii) are the one or more processes running independent are recent to this network, and iii) are the one or more processes running independent connect to the endpoint, which the endpoint is a rare connection for this network, which are referenced and compared to one or more AI models trained with machine learning on the normal behavior of the pattern of life of the system, where the process identifier module cooperating with the agent analyzer data analysis process applies a JA3 hash function to network traffic transiting over the secure communication connection and/or perform an analysis of user agent data to network traffic transiting over the unsecure communication connection in order to generate process connection fingerprints, which can also be stored in the data store, where the process connection fingerprints contain multiple characteristics of the endpoint connection.

15. The method of claim 13, where the analyzer module analyzes all endpoint connections split up by JA3 hashes or user agent data by similarity to each other, where the analyzer module groups similar JA3 connections or user agent data and separates them out in multiple groups in order to analyze the smaller groups of similar i) JA3 connections individually linked to each distinct process range of distinct connection endpoints or ii) user agent data individually linked to each distinct process' user agent data for the range of distinct connection endpoints.

16. The method of claim 13, where the analyzer module conducts the investigation and makes a final decision that need not be a positive determination that a cyber threat has been detected but rather a determination that something interesting is occurring in the system, where the something interesting can be a possible cyber threat but at least one of i) should be brought to an attention of a human cyber security analysis and ii) further warrants a more in-depth cyber threat investigation with the one or more AI models trained on potential cyber threats, where the one or more AI models trained on potential cyber threats and the assessment module with the AI classifiers cooperate to determine that a cyber-attack is occurring and assign the numerical assessment of a most likely cyber threat hypothesis that is occurring, which is indicative of a severity of the cyber-attack underway.

17. The method of claim 11, where the analyzer module uses the exfiltration data analysis process to at least one of i) identify the abnormal behavior, ii) identify the suspicious activity, iii) provide the additional system data points, and iv) any combination of these three, from one or more entities in the system in order to start and/or further the investigation on possible cyber threats, where the analyzer module using the exfiltration data analysis process cooperates with the cyber threat analyst module configured to form and investigate hypotheses on what are the possible set of cyber threats to start the investigation to form one or more hypotheses on what are the possible set of cyber threats that could include the initially identified abnormal behavior and/or suspicious activity, as well as, where the analyzer module using the exfiltration data analysis process is configured to cooperate with a data store to gather system data points to support or refute the investigation on possible cyber threats, where the exfiltration data analysis process is configured to identify and correlate data transfers to one or more online services or other external network locations when multiple different IP address exist for that online services or other external network location by correlating multiple different types of identifying information to the same online service or the same external network location.

18. The method of claim 17, where the analyzer module with the exfiltration data analysis process cooperates with the trigger module to detect each time an upload of data transfer over any of i) a set volume of data itself, ii) a set volume of data of contents in a zip file, and iii) a set volume of data of content in an embedded link, is occurring so that information about that data transfer, including data and meta data, is stored in the data store, and then analyzed with the exfiltration data analysis process in the analyzer module.

19. The method of claim 11, where the analyzer module uses the network scan data analysis process to at least one of i) identify the abnormal behavior, ii) identify the suspicious activity, iii) provide the additional system data points, and iv) any combination of these three, from one or more entities in the system in order to start and/or further the investigation on possible cyber threats, where the analyzer module using the network scan data analysis process is configured to cooperate with the cyber threat analyst module configured to form and investigate hypotheses on what are the possible set of cyber threats to start the investigation in order to form one or more hypotheses on what are the possible set of cyber threats that could include the initially identified abnormal behavior and/or suspicious activity, as well as, where the analyzer module using the network scan data analysis process cooperates with the data store to support or refute the investigation on possible cyber threats, where the network scan data analysis process is configured to create a virtual tree of IP address space to detect when abnormal scans of one or more IP address ranges occurs via node entropy.

20. The method of claim 19, the network scan data analysis process is further configured where each node in the virtual tree of IP address space represents an IP address range, where the network scan data analysis process cooperates with the data store to calculate and store the node entropy for each node, and then to look for a change in node entropy from its calculation, which will indicate that most likely this node of IP addresses has been recently scanned.

* * * * *